(12) United States Patent
Bam et al.

(10) Patent No.: US 9,396,603 B2
(45) Date of Patent: Jul. 19, 2016

(54) METHOD AND APPARATUS FOR MANAGING SERVICES USING REUSABLE BEARER TAGS

(75) Inventors: Ajay Bam, Cambridge, MA (US);
Damien Balsan, Belmont, MA (US)

(73) Assignee: NOKIA TECHNOLOGIES OY, Espoo (FI)

(*) Notice: Subject to any disclaimer, the term of this patent is extended or adjusted under 35 U.S.C. 154(b) by 1384 days.

(21) Appl. No.: 12/471,315

(22) Filed: May 22, 2009

(65) Prior Publication Data

US 2010/0294835 A1 Nov. 25, 2010

(51) Int. Cl.
*G06K 5/00* (2006.01)
*G07F 7/08* (2006.01)
*G06Q 20/28* (2012.01)
*G06Q 20/32* (2012.01)
*G06Q 20/34* (2012.01)

(52) U.S. Cl.
CPC ........ *G07F 7/08* (2013.01); *G06Q 20/28* (2013.01); *G06Q 20/3278* (2013.01); *G06Q 20/349* (2013.01); *G06Q 20/355* (2013.01)

(58) Field of Classification Search
USPC ........................................................ 235/382
See application file for complete search history.

(56) References Cited

U.S. PATENT DOCUMENTS

| | | | |
|---|---|---|---|
| 5,915,226 A | 6/1999 | Martineau | |
| 6,205,327 B1 | 3/2001 | Sentinelli | |
| 6,557,753 B1 | 5/2003 | Beaujard et al. | |
| 7,016,311 B2 | 3/2006 | Tiernay et al. | |
| 7,441,706 B1 | 10/2008 | Schuessler et al. | |
| 7,506,819 B2 * | 3/2009 | Beenau | G01D 21/00 235/380 |
| 7,519,325 B2 * | 4/2009 | Wakim | G06Q 20/28 340/505 |
| 2002/0133545 A1 | 9/2002 | Fano et al. | |
| 2002/0139844 A1 * | 10/2002 | Rochman | G06Q 20/32 235/380 |
| 2002/0194075 A1 | 12/2002 | O'Hagan et al. | |
| 2003/0120745 A1 | 6/2003 | Katagishi et al. | |
| 2003/0135463 A1 * | 7/2003 | Brown | G06Q 20/04 705/44 |
| 2004/0176032 A1 | 9/2004 | Kotola et al. | |
| 2005/0216344 A1 | 9/2005 | Collet et al. | |
| 2007/0257774 A1 | 11/2007 | Stumpert et al. | |
| 2008/0103984 A1 * | 5/2008 | Choe | G06Q 20/20 705/76 |
| 2009/0023474 A1 * | 1/2009 | Luo | G06Q 20/32 455/557 |
| 2009/0048936 A1 * | 2/2009 | Lerch | G06Q 20/105 705/17 |
| 2009/0192912 A1 | 7/2009 | Griffin et al. | |
| 2010/0075666 A1 | 3/2010 | Garner | |

(Continued)

FOREIGN PATENT DOCUMENTS

| | | |
|---|---|---|
| CN | 101014985 A | 8/2007 |
| GB | 2 430 524 A | 3/2007 |
| WO | WO 2004/061734 A1 | 7/2004 |

OTHER PUBLICATIONS

Intl search report and written opinion for corresponding Intl app. No. PCT/FI2010/050359 dated Aug. 19, 2010, pp. 1-13.

(Continued)

*Primary Examiner* — Michael G Lee
*Assistant Examiner* — David Tardif
(74) *Attorney, Agent, or Firm* — Ditthavong & Steiner, P.C.

(57) ABSTRACT

An approach is provided for managing one or more services corresponding to a reusable prepaid bearer tag (e.g., near field communication (NFC) tag, radio frequency identification (RFID) tag, contactless card, or barcode). A request to manage a service is initiated by reading service information from a reusable prepaid bearer tag corresponding to the one or more services.

18 Claims, 27 Drawing Sheets

(56) References Cited

U.S. PATENT DOCUMENTS

| | | | |
|---|---|---|---|
| 2010/0082485 A1* | 4/2010 | Lin | G06Q 20/12 705/44 |
| 2010/0114775 A1* | 5/2010 | Griffin | G06Q 20/42 705/44 |
| 2010/0216396 A1 | 8/2010 | Fernandez et al. | |
| 2010/0222021 A1* | 9/2010 | Balsan | G06Q 20/18 455/406 |

OTHER PUBLICATIONS

Office action for related U.S. Appl. No. 11/597,863 dated Nov. 29, 2010, pp. 1-16.

Office action for related U.S. Appl. No. 11/597,863 dated Apr. 20, 2011, pp. 1-15.

Office action for related U.S. Appl. No. 12/395,512 dated Jul. 6, 2011, pp. 1-59.

Final Rejection for related U.S. Appl. No. 12/395,512 dated Feb. 9, 2012, pp. 1-30.

Office Action for Russian Patent Application No. 20111517806/08 dated May 17, 2013, 6 pages.

Office Action for corresponding Russian Application No. 2011151786 dated Dec. 3, 2013, English Language Summary included.

Office Action for corresponding Chinese Patent Application No. 201080022256.2 dated Jun. 24, 2015, with English-language summary, 7 pages.

Chinese Office Action corresponding to Chinese Patent Application No. 201080022256.2 dated Dec. 22, 2014, with English-language summary; 8 pages.

Chinese Office Action for related Chinese Application No. 201080022256.2, dated Apr. 23, 2014, with English-language summary, 9 pages.

Office Action for corresponding Chinese Patent Application No. 201080022256.2, dated Jan. 4, 2016, with English-language summary, 10 Pages.

* cited by examiner

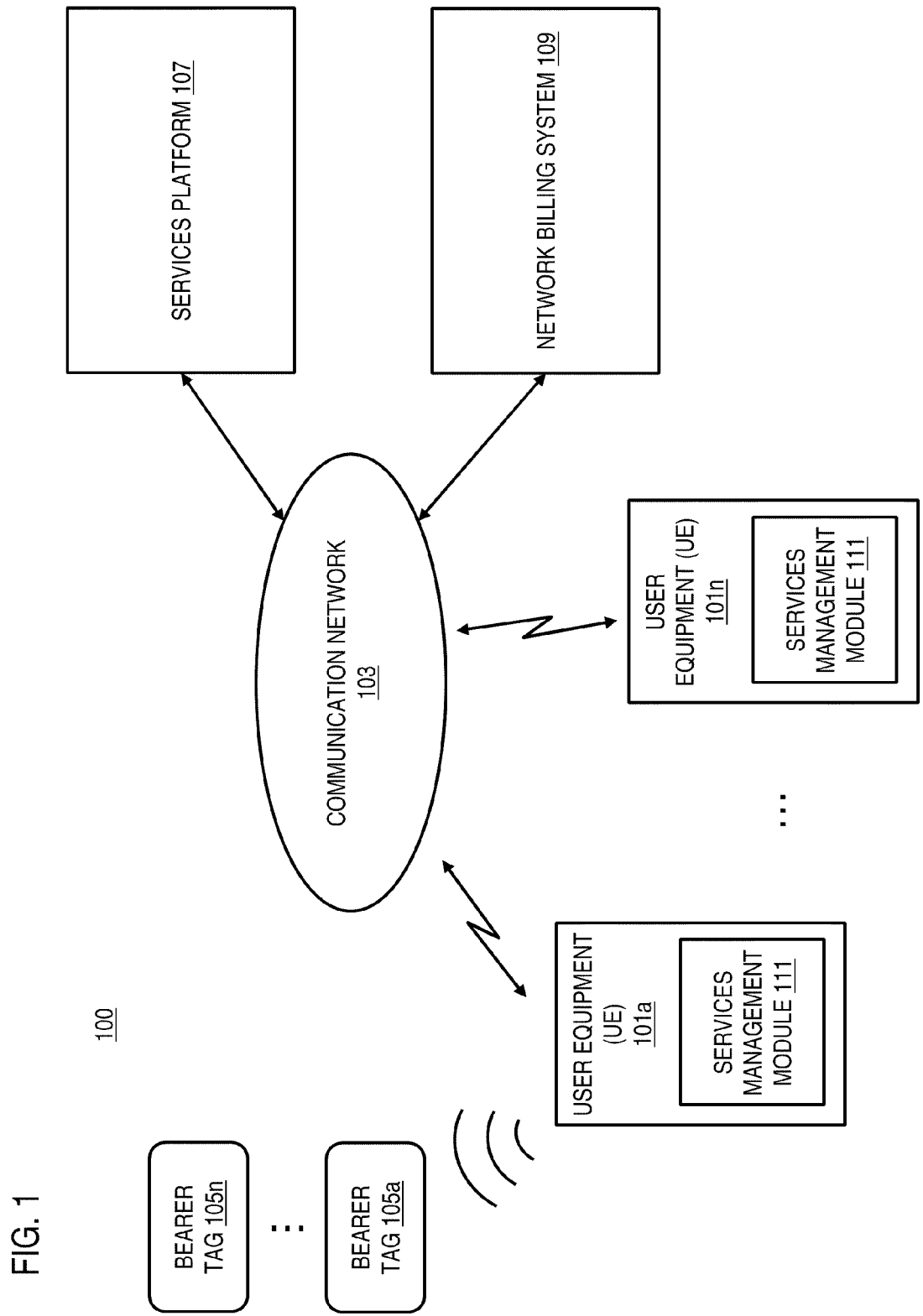

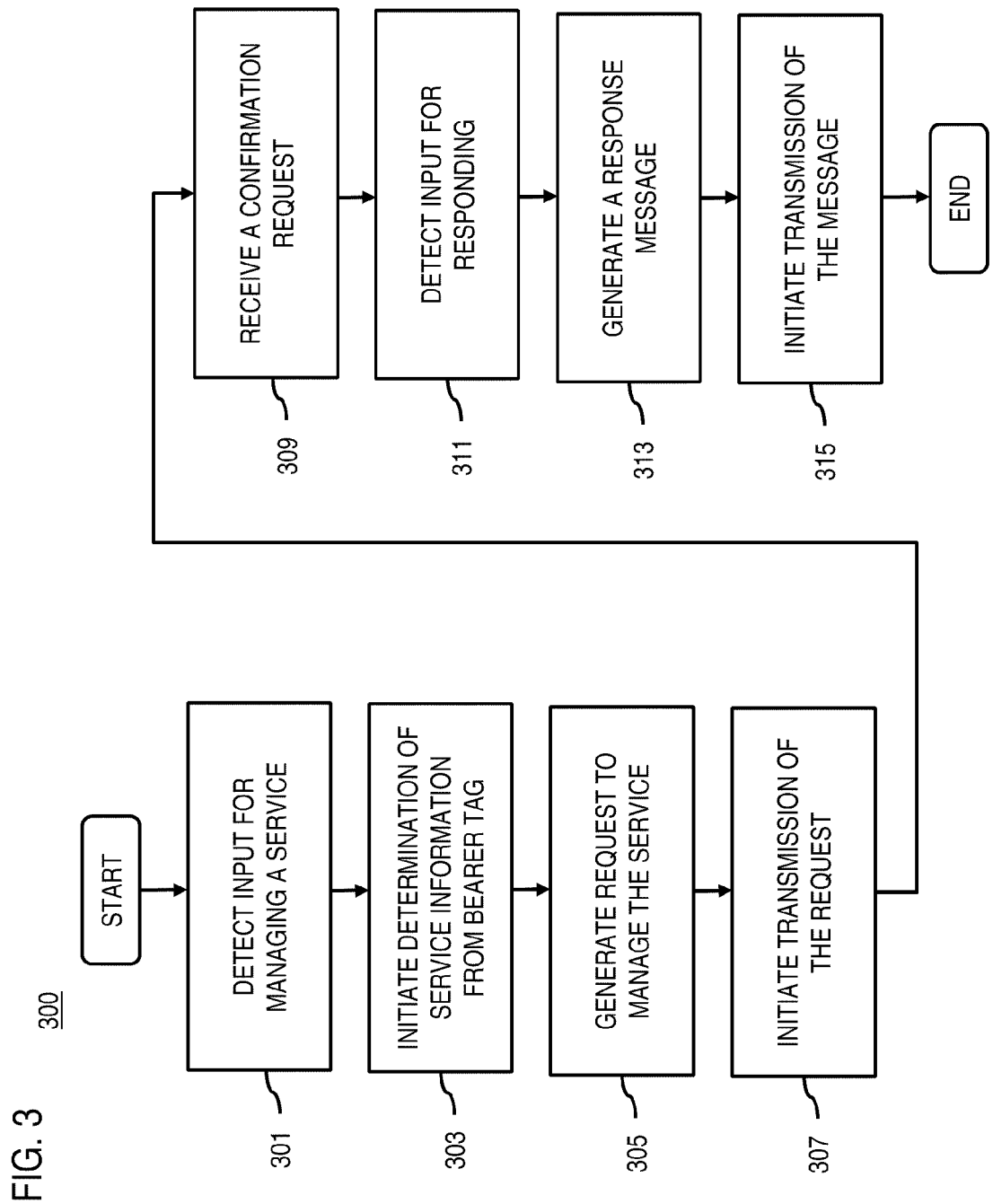

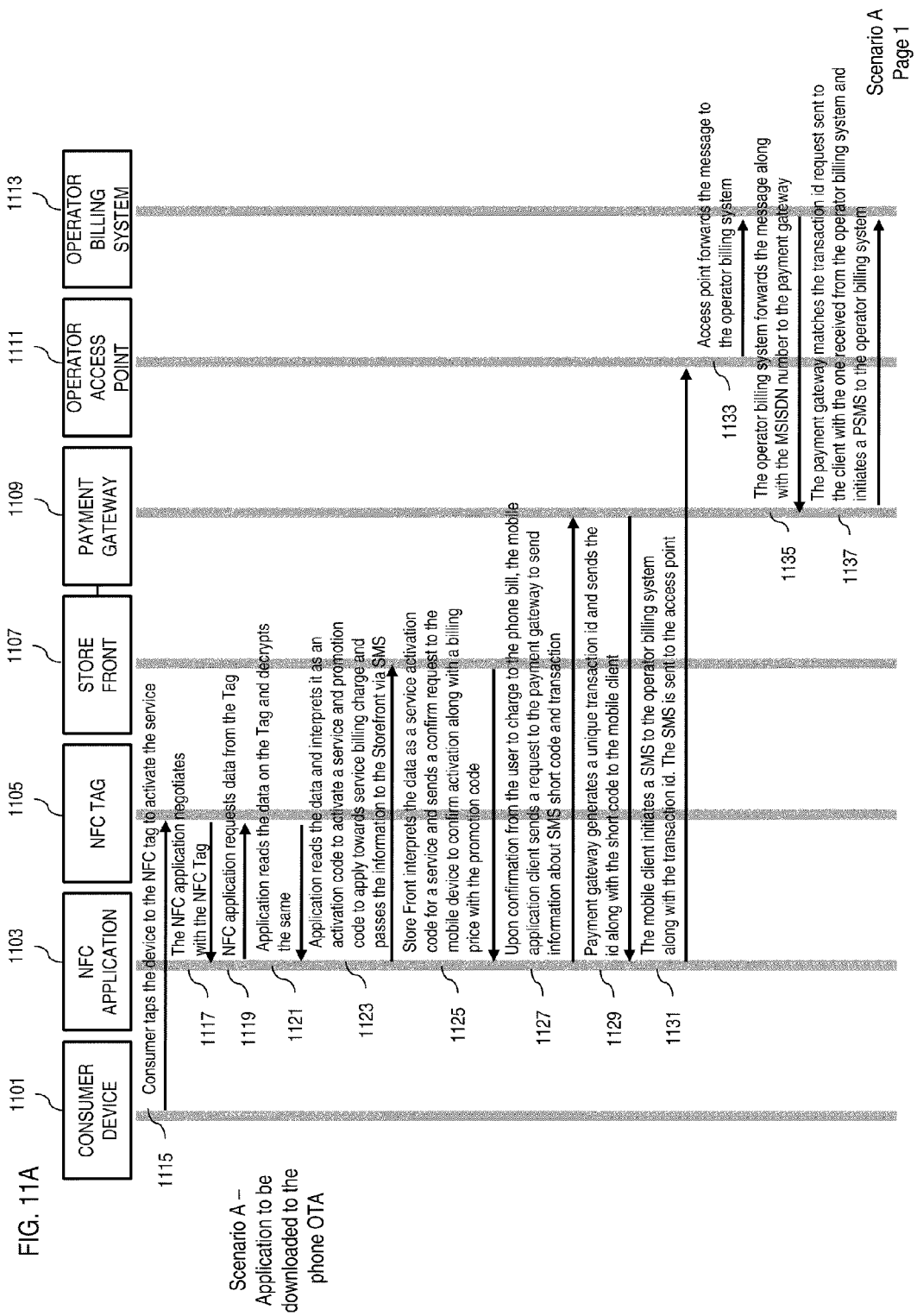

Scenario B Page 2

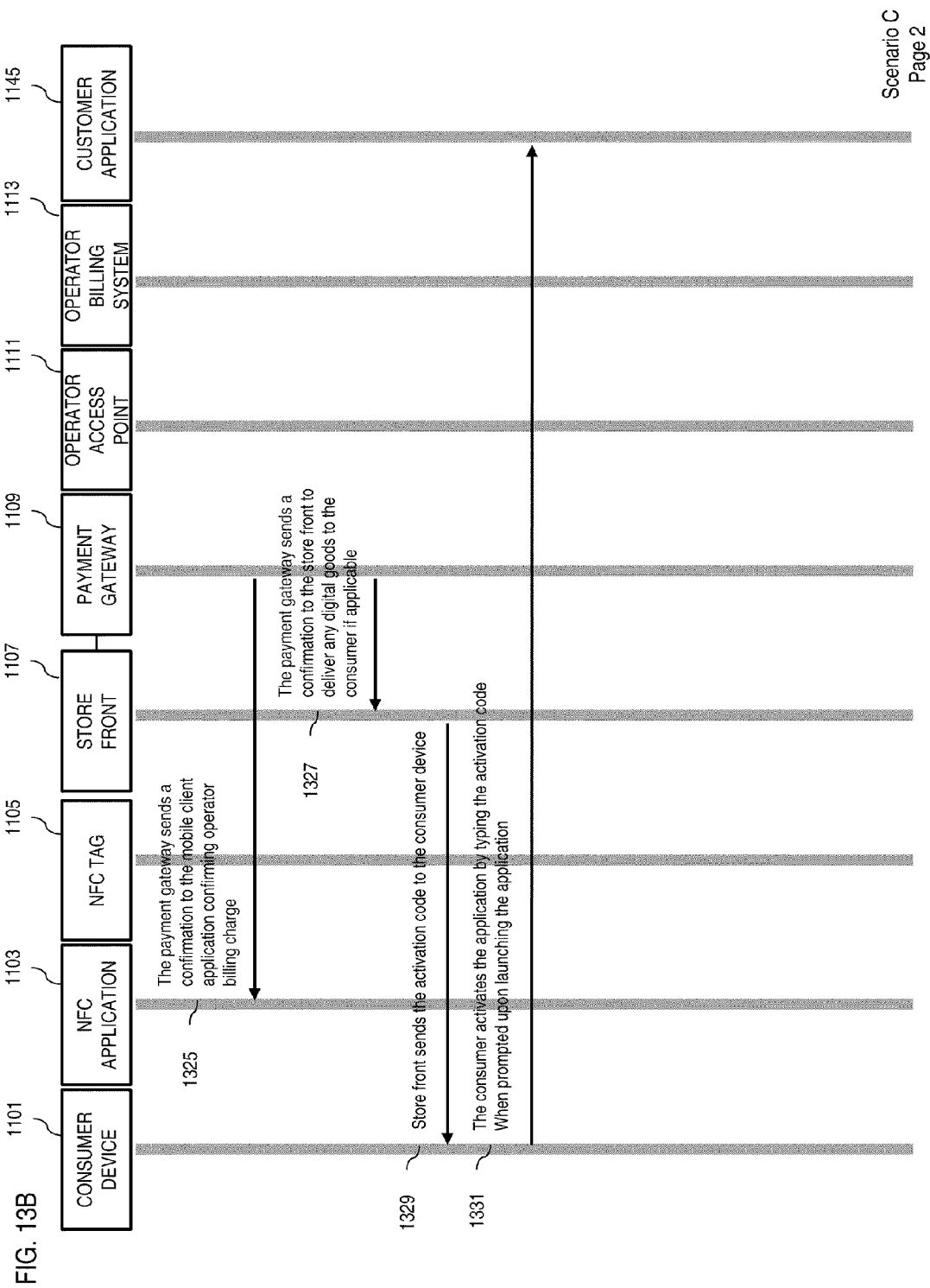

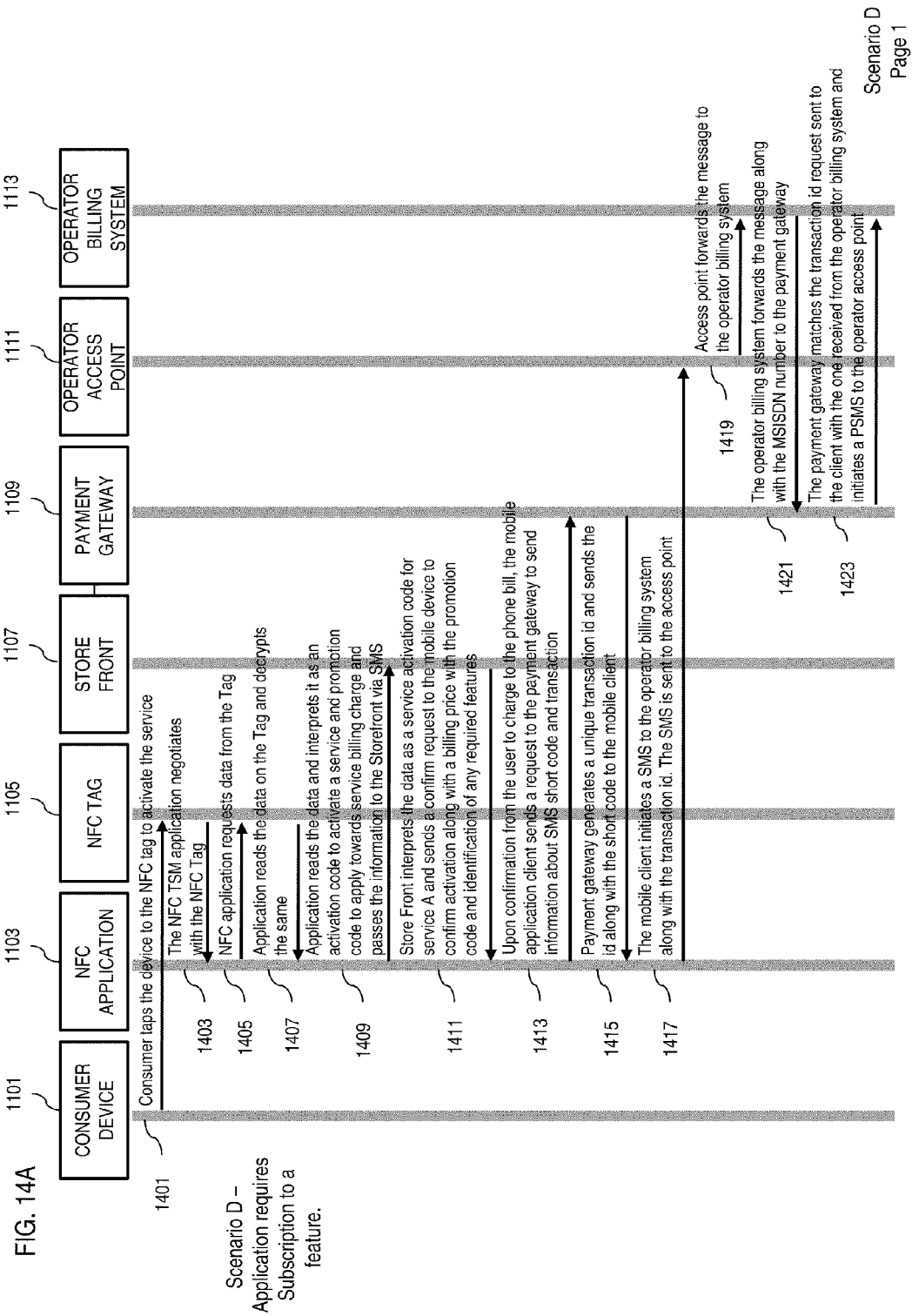

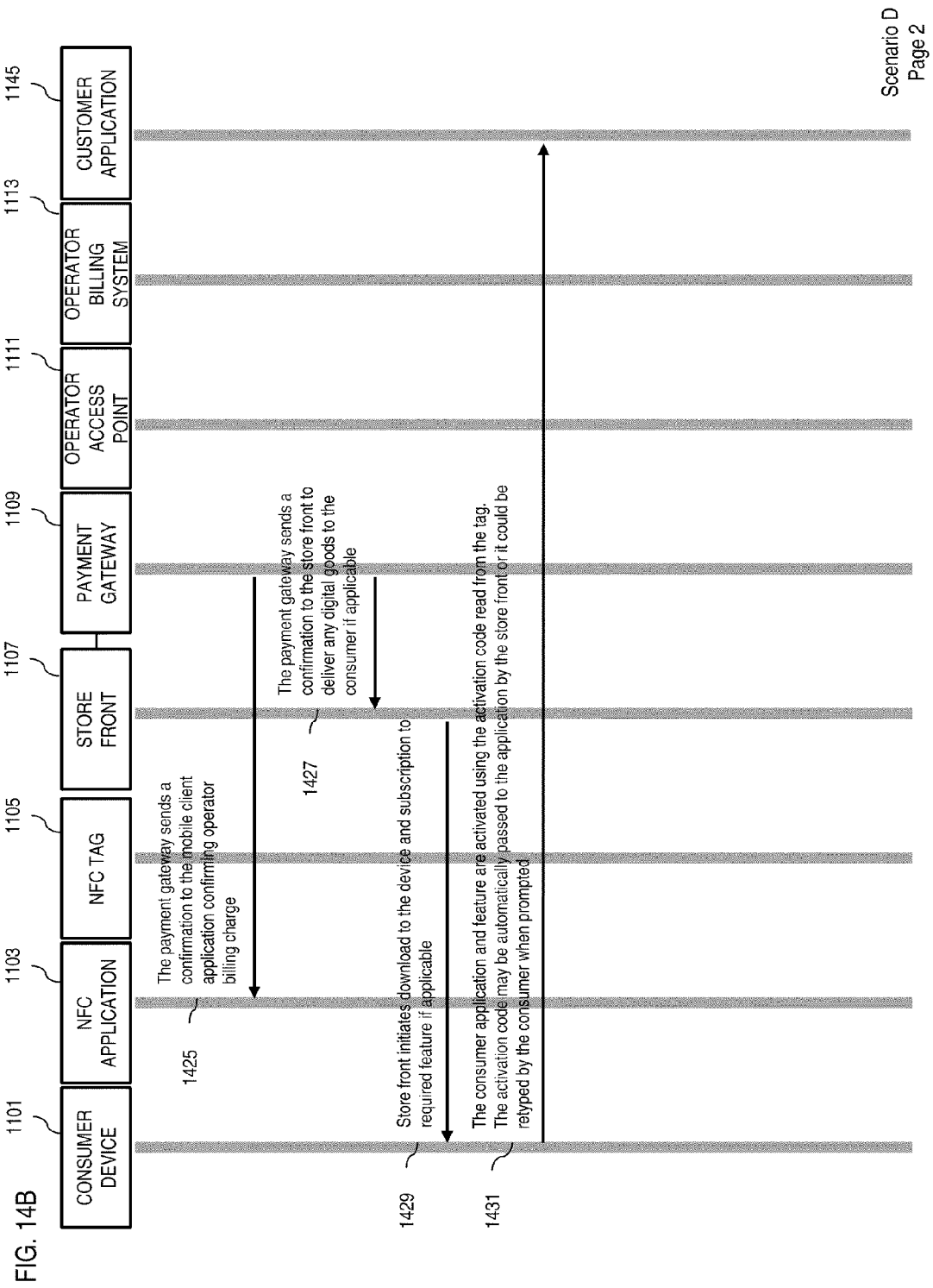

Scenario F –
Application purchased using a Store Front account

METHOD AND APPARATUS FOR MANAGING SERVICES USING REUSABLE BEARER TAGS

BACKGROUND

Wireless (e.g., cellular) service providers and device manufacturers are continually challenged to deliver value and convenience to consumers by, for example, providing compelling services, applications, and content. Beyond the sophisticated functions already included in many devices, service providers and device manufacturers are making a greater array of optional services (e.g., music, games, video, navigation, products, etc.) available to consumers. This increased variety, however, may conflict with the goal of delivering convenience to the consumer, in that generally it is more difficult for a consumer to manage (e.g., discover, select, access, purchase, engage, activate, modify, bill, etc.) a large library of services. Therefore, to be competitive and to promote the greater discovery and use of available services, the service providers and manufacturers need to address the ever growing requirement for more approaches for efficient and convenient management of services.

Some Exemplary Embodiments

According to one embodiment, a method comprises detecting input from a user for selecting one or more services corresponding to a bearer tag that is reusable by another user. The bearer tag specifies a first amount of currency for engaging one or more of the services by the user and a second amount of currency for the other user.

According to another embodiment, an apparatus comprising at least one processor, and at least one memory including computer program code, that at least one memory and the computer program code configured to, with the at least one processor, cause the apparatus to detect input from a user for selecting one or more services corresponding to a bearer tag that is reusable by another user. The bearer tag specifies a first amount of currency for engaging one or more of the services by the user and a second amount of currency for the other user.

According to another embodiment, a computer-readable storage medium carrying one or more sequences of one or more instructions which, when executed by one or more processors, cause the one or more processors to detect input from a user for selecting one or more services corresponding to a bearer tag that is reusable by another user. The bearer tag specifies a first amount of currency for engaging one or more of the services by the user and a second amount of currency for the other user.

According to yet another embodiment, an apparatus comprises means for detecting input from a user for selecting one or more services corresponding to a bearer tag that is reusable by another user. The bearer tag specifies a first amount of currency for engaging one or more of the services by the user and a second amount of currency for the other user.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 1 is a diagram of a communication system capable of managing services using bearer tags, according to an exemplary embodiment;

FIG. 3 is a flowchart of a process for requesting the activation or modification a service corresponding to a bearer tag, according to an exemplary embodiment;

FIGS. 11A and 11B are time sequence diagrams that illustrate a sequence of messages and processes for managing a service including an application download, according to various exemplary embodiments;

FIGS. 13A and 13B are time sequence diagrams that illustrate a sequence of messages and processes for managing a service including an application resident on a user equipment, according to various exemplary embodiments;

FIGS. 14A and 14B are time sequence diagrams that illustrate a sequence of messages and processes for managing a service including an application that requires subscription to another feature, according to various exemplary embodiments;

DESCRIPTION OF EXAMPLE EMBODIMENTS

Figure 2A:
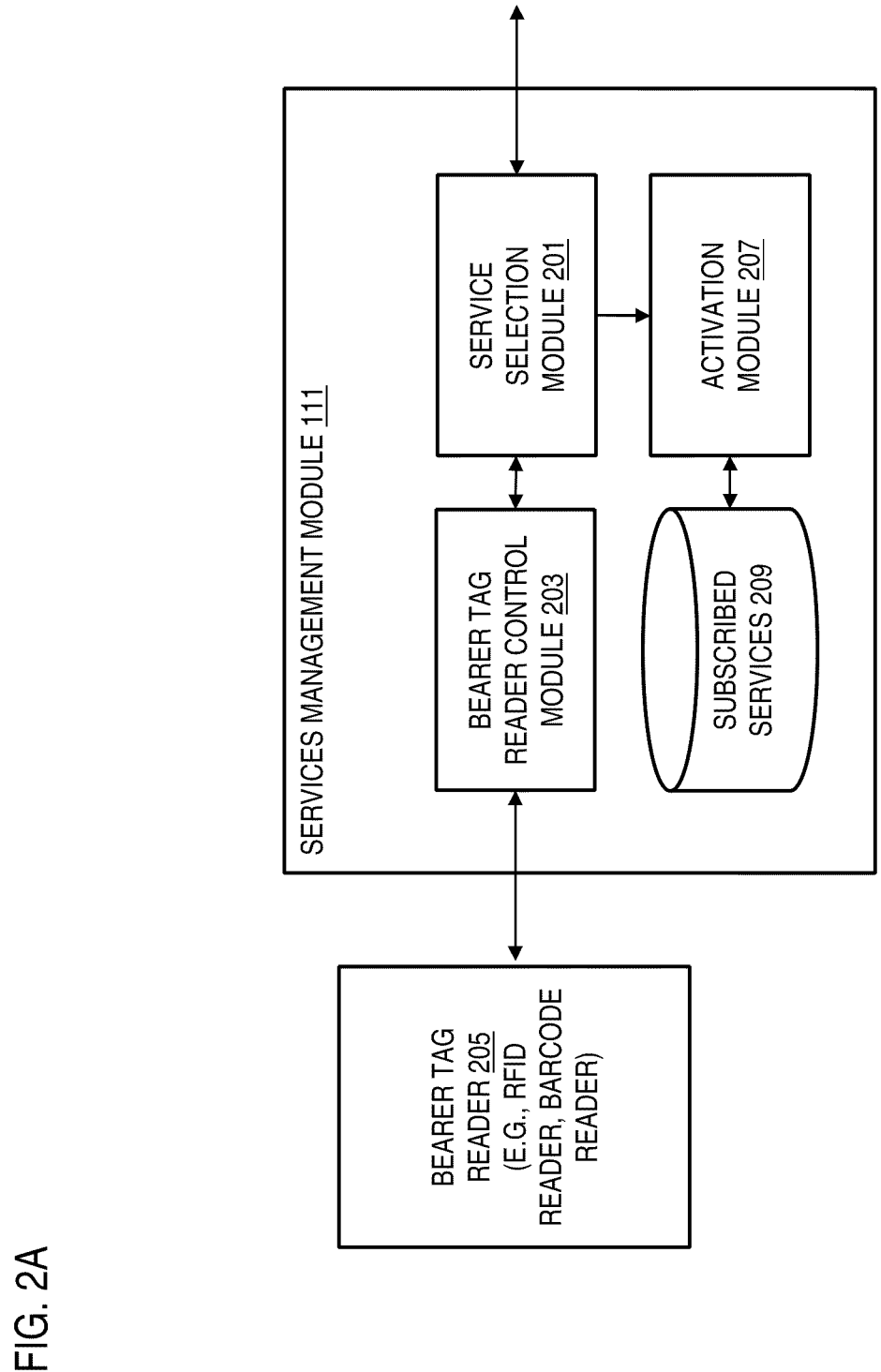
FIGS. 2A and 2B are diagrams of components of a services management module and components of a services platform, according to various exemplary embodiments.

A method and apparatus for managing one or more services using reusable prepaid bearer tags are disclosed. As previously stated, the term "services" as used herein refers collectively to services, applications, and content in a network and/or user equipment. In addition, the term "reusable" as used herein refers to the ability for multiple users to use the same prepaid bearer tag to access one or more services corresponding to the tag. In certain embodiments, the multiple users either may share the same prepaid amount of currency, such as a monetary value or a currency specific to the service (e.g., credits), associated with the bearer tag or may independently use the prepaid bearer tag so that each individual user of the prepaid bearer tag has independent access to the prepaid amount of currency associated with the bearer tag.

In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

FIG. 1 is a diagram of a communication system capable of managing services using bearer tags, according to an exemplary embodiment. As shown in FIG. 1, a system 100 comprises one or more user equipment (UEs) (e.g., UEs 101a-101n) having connectivity to a communication network 103. The UEs 101a-101n are any type of fixed terminal, mobile terminal, or portable terminal including desktop computers, laptop computers, handsets, stations, units, devices, multimedia tablets, Internet nodes, communicators, Personal Digital Assistants (PDAs), mobile phones, mobile communication devices, digital camera/camcorders, audio/video players, positioning devices, game devices, televisions, and/or the like, or any combination thereof. It is also contemplated that the UEs 101a-101n can support any type of interface to the user (such as "wearable" circuitry, etc.). The UEs 101a-101n permit rapid management, like for example discovery, activation, accessing, modification, billing, downloading, and set-up of one or more services, including services, applications, and content, or any combination thereof (referred to herein as "services").

By way of example, the communication network 103 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), the Internet, or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, mobile ad-hoc network (MANET), and the like.

The system 100 also includes bearer tags 105a-105n with each bearer tag 105 corresponding, for example, to one or more services. In exemplary embodiments, the bearer tag 105 is a near field communication (NFC) tag, radio frequency identification (RFID) tag, contactless card, barcode, or any combination thereof that contains information related to the one or more corresponding services. The service information contained in the bearer tag 105 may include, for instance, one or more service codes to identify the one or more services represented by the bearer tag 105. Further, the service information contained in the bearer tag 105 may include, for instance, one or more addresses of the service to identify the one or more services providers represented by the bearer tag 105. It is contemplated that in other embodiments, the bearer tag 105 may contain additional service related information (e.g., expiration date, use restrictions, etc.). The bearer tags 105a-105n, for instance, are embedded in, attached to, or printed on any of a variety of materials capable of supporting the tag (e.g., packaging material, a sticker, a poster, a card, a magazine, a newspaper, a display screen, etc.).

In certain embodiments, the bearer tags 105a-105n may also be associated with a prepaid amount of currency for use in engaging the service. In exemplary embodiments, prepaid bearer tags may be purchased from a service provider or other third party vendor. In some cases, prepaid bearer tags may also be given away as part of various promotions, advertisements, and the like. By way of example, the currency may be either actual monetary value (e.g., dollars, Euros, pounds, etc.) or may be proprietary currency used in the one or more services (e.g., in-game credits, credits for purchasing music from an online music store, etc). By providing the option of using prepaid bearer tags, the system 100 advantageously reduces the need to enter payment information (e.g., phone billing account, credit cards, bank account, etc.). The UEs 101a-101n each include one or more readers capable of reading the bearer tags 105a-105n, e.g., a near field communication (NFC) reader, radio frequency identification (RFID) reader, contactless card reader, barcode reader, camera, and/or the like, or any combination thereof.

By way of example, NFC, RFID, contactless card, and similar technologies are short-range wireless communication technologies that enable the exchange of data between devices over short distances (e.g., the range for NFC is approximately 4 inches). In general, these technologies comprise two main components, a tag (e.g., attached to an object) and a reader (which can be implemented with the UEs 101a-101n). Communication between the reader and the tags occur wirelessly and may not require a line of sight between the devices. The tag (e.g., an RFID transponder) is, for instance, a small microchip that is attached to an antenna. The tags can vary in sizes, shapes, and forms and can be read through many types of materials.

Moreover, the tags may be passive tags or active tags. Passive tags are generally smaller, lighter, and less expensive than active tags. Passive tags are only activated when with the response range of a reader. The reader emits a low-power radio wave field that is used to power the tag so as to pass on any information that is contained on the chip. Active tags differ in that they incorporate their own power source to transmit rather than reflect radio frequency signals. Accordingly, active tags enable a broader range of functionality like programmable and read/write capabilities.

A reader typically contains a transmitter, receiver, control unit, and an antenna. The reader performs three primary functions: energizing the tag, demodulating and decoding the returned radio signal. In certain embodiments, a reader includes an additional interface to convert the returned radio signal to a form that can be passed to another system such as a computer or programmable logic controller.

A barcode reader relies on optical technology to read a barcode. Typically, the barcode reader's photo sensors optically scan a barcode to convert the bars comprising a barcode image into one or more alphanumeric characters. These characters then represent the code. In certain embodiments, the barcode includes an additional checksum bar to ensure accurate decoding.

As shown in FIG. 1, the UEs 101a-101n have connectivity to a services platform 107, such as OVI.com® and OVI Store, and a network billing system 109 through the communication network 103. Further, the services platform 107 and a network billing system 109 may be a same platform or service, In exemplary embodiments, the services platform 107 links the service information contained in the bearer tags 105a-105n with their corresponding services to activate, modify, bill, download, or otherwise manage the services on the UEs 101a-101n. In certain embodiments, the services platform 107 also interacts with the network billing system 109 to coordinate payment and billing for the services. The network billing system 109 is owned or served by, for instance, a service provider (e.g., cellular service provider) through which the users of UEs 101a-101n have their communication (e.g., wireless) service. Accordingly, the user of UEs 101a-101n generally already has a billing relationship with the network billing system 109 and the associated service provider. It is contemplated that the network billing system 109 may also be owned by third party such as third party payment providers, like credit card service provider, banks, etc. Moreover, the network billing system 109 may be used to authorized payments from prepaid.

According to certain embodiments, the system 100 enables the management of one or more services. As seen in FIG. 1, the UEs 101a-101n include, for instance, a services management module 111, such as service client, to manage the one or more services. It is contemplated that the term "management" of services as used herein refers to actions including discovering a service, browsing a service, selecting a service, downloading a service, activating a service, modifying a network, cancelling a service, paying for a service, and the like.

In an example embodiment, a mechanism, e.g., services management module 111, is introduced to detect input from a user for managing (e.g., activating or modifying) a service corresponding to a bearer tag 105. In exemplary embodiments, reading the service information from the bearer tag 105 quickly identifies the requested service and/or address of the requested service. A request is generated to manage the service according to the service information from the bearer tag 105, and is forwarded to the services platform 107, e.g. based on the address, for processing according to a billing arrangement or a predetermined billing arrangement with, for instance, the carrier. For example, the billing arrangement is effected using mechanisms such as premium short message service (PSMS), wireless application protocol (WAP) billing service. The billing arrangement also may be configured to bill the user periodically (e.g., one a month) without additional action from the user. In certain embodiments, the system 100 further reduces the administrative and data entry burdens associated with paying for services by enabling payment via a prepaid bearer tag 105 corresponding to one or more services.

Moreover, the process of managing a service may occur automatically, thereby enabling a user to browse, initiate, download and pay for a service by, for instance, simply tapping or bringing a UE 101 close to a bearer tag 105 associated with the service. It is noted that a service that can be initiated and downloaded quickly and billed through a single tap is likely to be more attractive to users, which can drive more users to the service.

By way of example, the UEs 101a-101n communicate with the other devices on the communication network 103 (e.g., the services platform 107) using standard protocols. In this context, a protocol includes a set of rules defining how the network nodes within the communication network 103 (e.g., UEs 101a-101n and services platform 107) interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination/address, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2B:
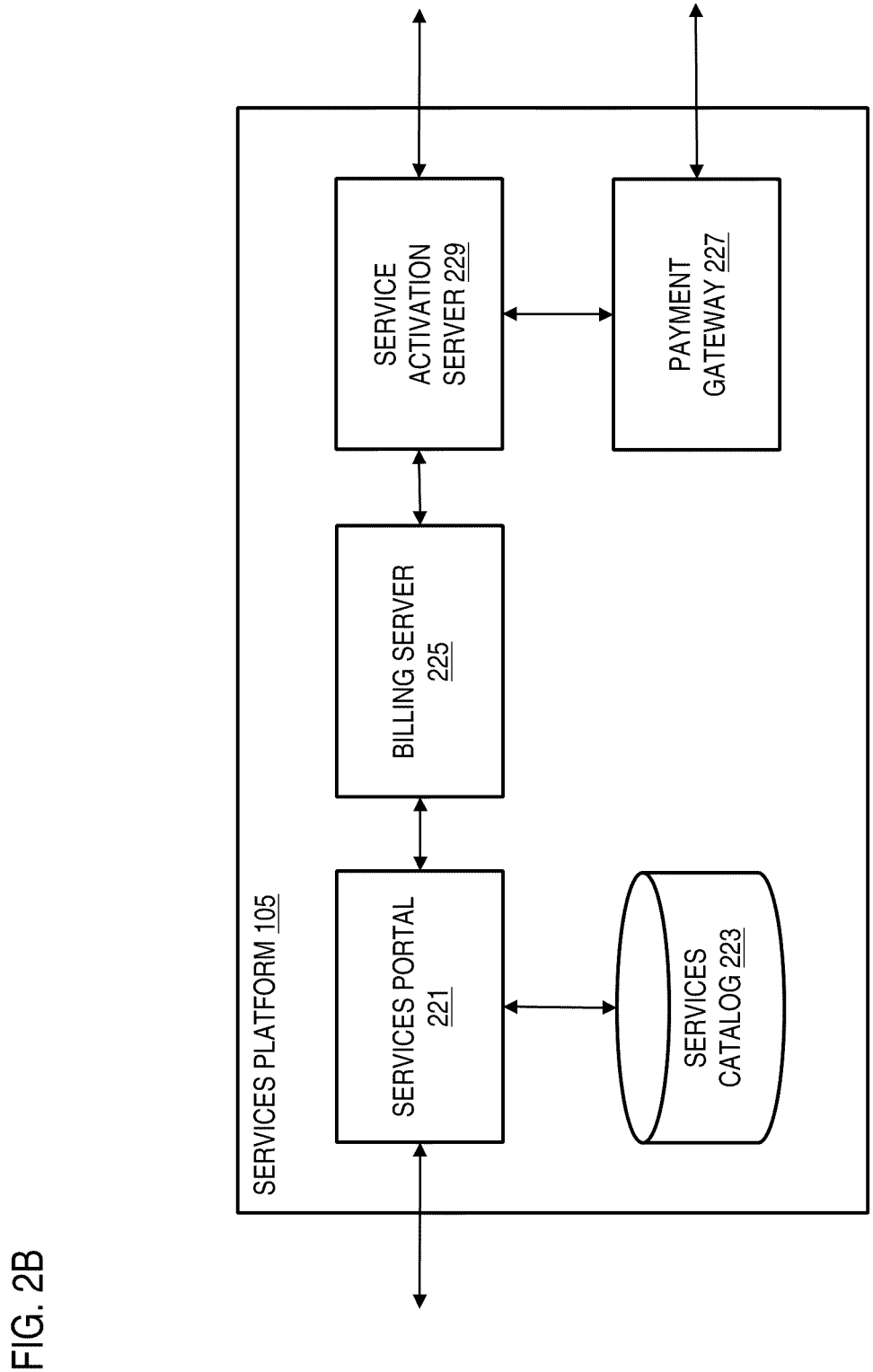

FIGS. 2A and 2B are diagrams of components of a services management module and components of a services platform respectively, according to various exemplary embodiments. As shown in FIG. 2A, the services management module 111 includes several sub-modules to manage services corresponding to bearer tags 105a-105n. It is contemplated that the functions of the sub-modules may be combined or performed by other components or logic of the UE 101. In exemplary embodiments, the services management module 111, e.g. a service platform client, includes a service selection module 201 for detecting a request from a user to manager a service corresponding to a bearer tag. The module 201 may, for instance, interact with a bearer tag reader control module 203 to detect the request. By way of example, the user request may be indicated by tapping the UE 101 one or more times on or near the bearer tag. The number of taps to initiate a request is configurable by the user, the service provider, or both. It is also contemplated that tapping includes bringing the UE at least sufficiently close enough to the bearer tag 105 so that the UE 101 can detect a return signal from the bearer tag 105. A physical tap is not necessary. In addition or alternatively, the user can signal a request to manage a service by activating one or more buttons or menu options on the UE 101, by causing the user UE 101 to read the bearer tag (e.g., cause the UE 101's barcode reader to scan a barcode), or by any combination thereof.

After detecting a service request, the service selection module 201, for example, causes the reader tag control module 203 to interact with an external bearer tag reader 205 (e.g., RFID reader, barcode reader). More specifically, the module 203, for instance, initiates the reader 205 to determine the service information contained in the bearer tag 105 and receives the raw data from reader 205 for processing by the service selection module 201. In certain embodiments, the bearer tag reader is a component of the UE 101 (e.g., a handset with a built-in reader) in which the services management module 111 resides. In other embodiments, the reader may be an external peripheral attached to the UE 101 (e.g., a barcode scanner connected to a PDA).

The service selection module 201 then uses the service information to generate a service management request for transmission to the services platform 107. The service management request, for instance, includes information such as the requested service and identification of the user. It is contemplated that the request may include other information needed to process to specific requests (e.g., quantity of product, duration of subscription, etc.).

In certain embodiments, the service selection module 201 is also configured to receive and process a request from the services platform 107 to confirm service management requests. By way of example, the confirmation request from the services platform 107 includes billing information, if any, associated with the requested management action. After confirmation and subsequent completion of any management action, the service selection module 201 interacts with the activation module 207 to activate the request service or implement any modifications. The activation module 207 has connectivity to a database 209 of subscribed services for storing service records and settings.

FIG. 2B is a diagram of the components of a services platform, according to an exemplary embodiment. As shown in FIG. 2B, the services platform 107 includes several components to manage services corresponding to bearer tags 105a-105n. It is contemplated that the functions of the components may be combined or performed by other components within the platform 107. In exemplary embodiments, the services platform 107 includes a services portal (e.g., store front) 221 for receiving service management requests and delivering services to the UEs 101a-101n. The services portal 221 has connectivity to a services catalog database 223 containing information to identify the services of the received request using the service information from the corresponding bearer tag 105. On receipt of a request, the services portal 221 interacts with the database 223 and billing system (e.g., server) 225 to determine user information and/or the billing information (e.g., monthly fee, discounts, promotions, product cost, credit card number, bank account, credit point, etc.) associated with the received service management request. The services portal 221 uses the billing information to generate a message requesting confirmation of the service management request from the user.

On receipt of the user confirmation, the services portal 221, for example, directs the payment gateway 227 to collect the fees associated with the request. In exemplary embodiments, the payment gateway 227 may interact with the network billing system 109 to collect payment using, for example: (1) direct billing to the user using the International Mobile Station Identity (IMSI) associated with the user's UE 101, wherein the user's phone bill is directly charged for any fees and the payment gateway 227 makes a billing request to the network billing system 109 to recover the fees based on the IMSI; (2) direct billing using a 3G/GPRS access point, wherein the user's phone bill is directly charged for any fees and the payment gateway 227 makes a billing request to the network billing system 109 to recover the fees based the network assigned ID (e.g., a Mobile Subscriber Integrated Digital Services Network (MSISDN) number); (3) direct billing using a wireless access protocol (WAP) access point, wherein the user's phone bill is directly charged for any fees and the payment gateway 227 makes a billing request to the network billing system 109 to recover the fees based the network assigned ID (e.g., MSISDN) (i.e., WAP direct billing); (4) direct billing using WAP, wherein the user accesses a WAP portal to authorize payment against the user's phone bill and the payment gateway 227 makes a billing request to the network billing system 109 to recover the fees (i.e., WAP online billing); (5) direct billing using premium short message service (SMS) MO billing wherein an SMS sent from the user's device triggers direct billing against the user's phone bill and wherein the network billing system 109 sends the collected fees to the payment gateway 227 based on the SMS transaction identification; (6) direct billing using premium short message service (SMS) MT billing wherein an SMS sent to the user's device triggers direct billing against the user's phone bill and wherein the network billing system 109 sends the collected fees to the payment gateway 227 based on the SMS transaction identification; (7) direct billing against a prepaid account associated with the one or more services; (8) direct billing to a user account registered with the service services portal 221 (e.g., the Nokia Ovi Store) wherein the payment gateway 227 makes a billing request against the form of payment (e.g., credit card) registered with the services portal 221; and (9) direct billing against a third party payment provider (e.g., credit card payment provider). In exemplary embodiments, the user, the service provider, or both can configure the payment mechanism used by the services platform 107.

After collecting the appropriate payment, the payment gateway 227 sends the payment or, in some cases, verification of the payment to the services portal 221. The services portal 221 then interacts with the service activation system 229 (which may be implemented as a server) to initiate activation or modification of a service according to the service management request.

FIG. 3 is a flowchart of a process for managing services, according to an exemplary embodiment. In one embodiment, the services management module 111 performs the process 300 and is implemented in, for instance, a chip set including a processor and a memory as shown FIG. 19. At 301, the module 111 detects input from a user for activating or modifying a service corresponding to a bearer tag 105. At the chip level, the module 111 detects the input by, for instance, receiving a signal via the bearer tag reader control module 203 that a bearer tag 105 has been detected. In certain embodiments, a user input is not needed to initiate certain services or features (e.g., activation of a service), and service management may proceed with no user input. The module 111 then initiates a determination of the service information contained within the bearer tag 105 by signaling the bearer tag reader 205 to read the bearer tag 105 (at 303). Based on the service information, the module 111 generates a service management request (e.g., subscribe to an E-mail service, browse service offering, purchase a song, cancel a subscription) (at 305) and initiates transmission of the request to the services platform 107 for completing the service management request according to a predetermined billing arrangement (at 307).

Next, the module 111 receives and displays a message from the services platform 107 requesting confirmation of the service management of the service management actions that the services platform 107 will perform (at 309). On receipt of the request, the module 111 detects a user input indicating a response to the confirmation request (e.g., proceed with request, or cancel request) (at 311). The module 111 then generates a message containing the user's response to the confirmation request (at 313) and initiates transmission of the message to the services platform 107 (at 315).

Figure 4:
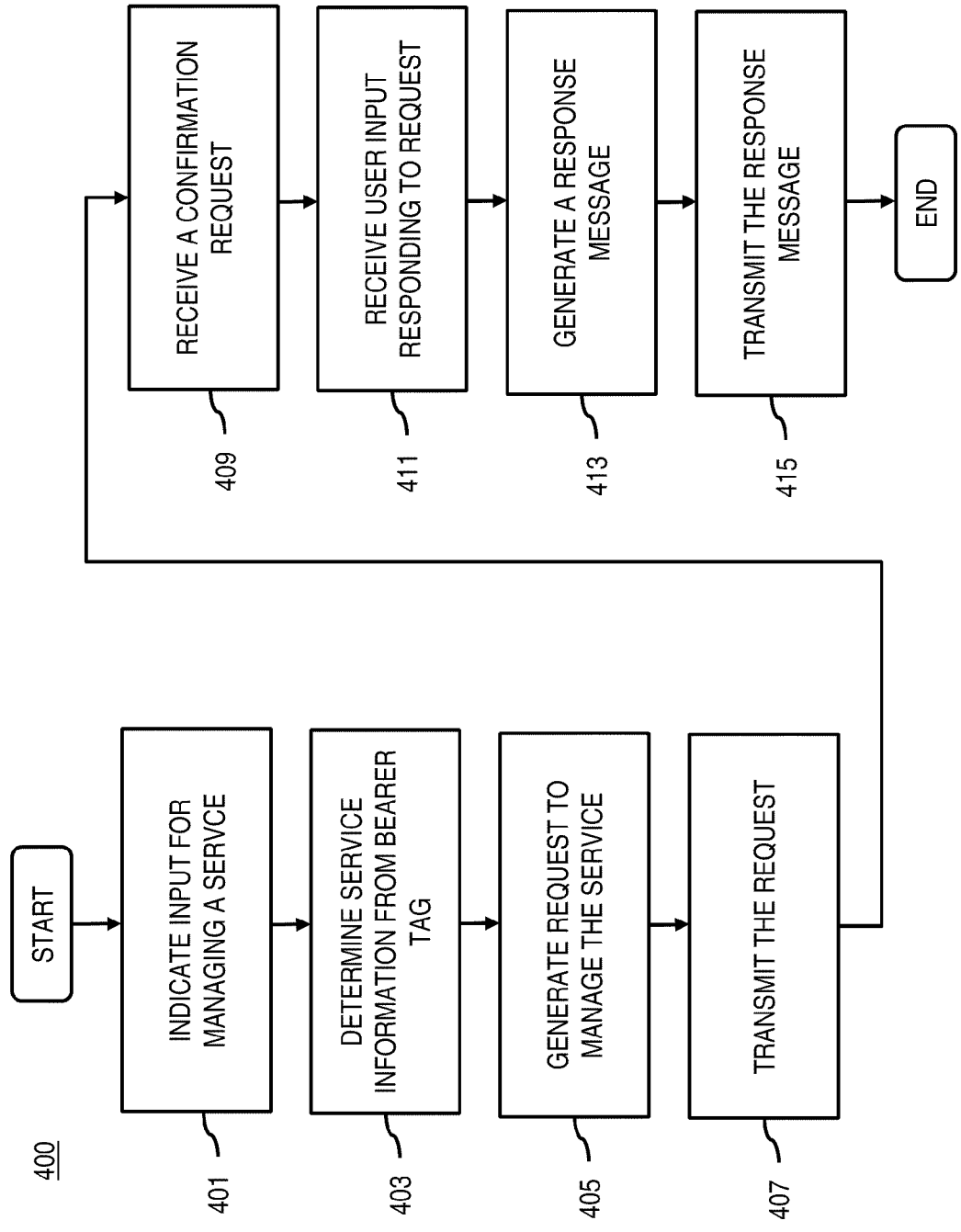
FIG. 4 is a flowchart of a process for managing services using a user equipment, according to an exemplary embodiment.

FIG. 4 is a flowchart of a process for managing services using a user equipment, according to an exemplary embodiment. As discussed previously, exemplary embodiments include the services management module 111 within the UEs 101a-101n (e.g., hardware such as a wireless handset, laptop computer, etc.). The incorporation of the module 111 within the UEs 101a-101n extends the functions of the module 111 to the communication network 103 in which the UE 101 operates. Additionally, certain embodiments configure the UE 101 to include components (e.g., a bearer tag reader 205, wireless transmitter (not shown)) not included with the module 111. Consequently, the UE 101a, for example, is capable of directly reading the bearer tag 105 and transmitting messages over the communication network 103.

Process 400 begins with the UE 101 indicating a user input for managing a service corresponding to a bearer tag 105 (at 401). In certain embodiments, the user input is indicated by tapping a user equipment one or more times on or near the bearer tag 101, by activating one or more buttons or menu options on the UE 101 itself, by using the UE 101 to read the bearer tag 105, or by a combination thereof. It is contemplated that the user, the service provider, or both may configured the number of taps, buttons, or menu options to indicate a service management request. It is also contemplated that in certain embodiments, a user input is not needed to initiate certain services or features (e.g., activation of a service), and service management may proceed with no user input. The UE 101a then reads service information contained in the bearer tag 105 using, for instance, an NFC reader, RFID reader, contactless card reader, a barcode reader, or any combination thereof (at 403). Based on the service information, the UE 101a generates a service management request message (at 405) and transmits the message, per at 407, to the services platform 107.

Like the process described with respect to the services management module 111, the UE 101a receives and displays a message from the services platform 107 providing the associated billing information and requesting confirmation of the service action (at 409). Next, the UE 101a receives input from the user responding to the request (e.g., proceed with request or cancel request) (at 411), generates a response message based on the user input (at 413), and transmits the response message to the services platform 107 (at 415) for instructing the services platform 107.

In exemplary embodiments, the UE 101 may be configured to perform the process 400 to manage a service (e.g., initiate a service) using a "one tap" mode of operation. In this mode, a single tap (or other similar action) on a bearer tag 105 as described at 401 initiates the service management action (e.g., service activation). All other actions of the process 400, as well as any associated service enablement and billing actions, are completed automatically by the services platform 107 and network billing system 109 using previously stored information (e.g., account, billing, and payment information) related to the user. This information, for example, was collected from the user when the user initiated the wireless service. In the case of a prepaid bearer tag 105, the billing information is associated with the bearer tag 105 itself. In this way, the user need not input any previously stored information when managing services under the process 400.

As discussed previously, the use of a one tap mode of operation for managing (e.g., activating, purchasing, subscribing, etc.) a service may improves overall convenience to the user when accessing the service. This added convenience may in turn encourage greater use of the service.

Figure 5:
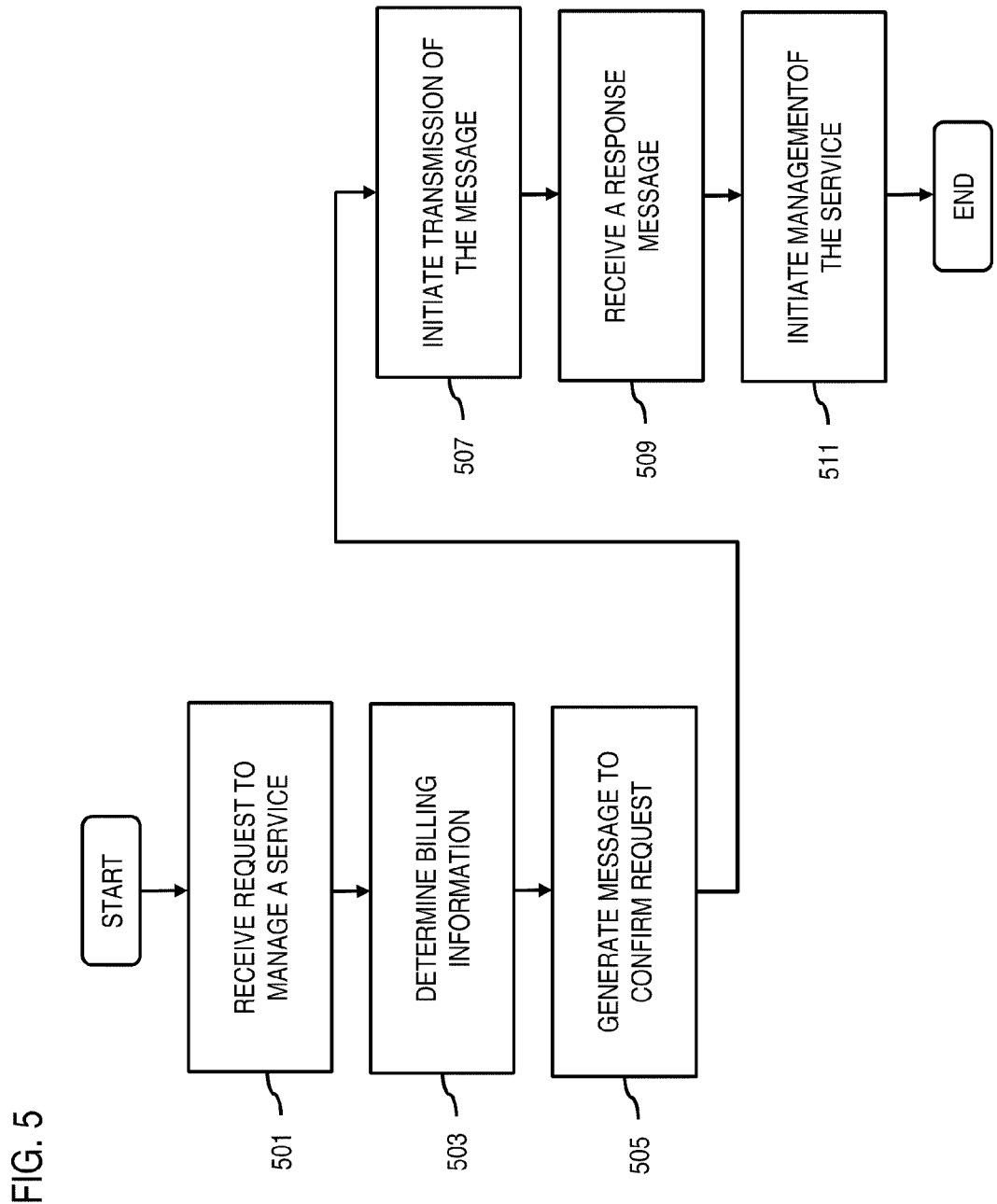
FIG. 5 is a flowchart of a process for activating or modifying a service corresponding to a bearer tag, according to an exemplary embodiment.

FIG. 5 is a flowchart of a process for managing a service corresponding to a bearer tag, according to an exemplary embodiment. In this example, the services platform 107 receives a request to manage (e.g., activate, bill, download or modify) a service corresponding to a bearer tag 105 from the UE 101, at 501. The request, for instance, identifies the service according to the service information contained in the bearer tag 105 as well as the UE 101 making the request. In response, the services platform 107 identifies the requested service and associated billing information using, for example, the services catalog database 223 (at 503). The platform 107 then generates a message requesting that the user confirm service management request and billing information (at 505) and initiates a transmission of the request to the user (at 507).

In certain embodiments, the one or more services corresponding to a bearer tag 105 can be limited to certain geographical areas (e.g., Atlanta or New York City). In this case, the services platform 107 is also configured to validate the service management request based on location. The term "validate" refers to a process for ensuring that a UE 101 meets the conditions (e.g., location requirement) to manage a service. To validate the location information, the services platform 107 may obtain the location of the UE 101 by, for instance, identifying the wireless communication cell in which the UE 101 is operating, using the global positioning satellite (GPS) receiver of the UE 101, or using other like location technologies. In one embodiment, the location restriction for a service may be classified alternatively or additionally by continent (i.e., a particular service is available only in North America or Europe). By way of example, the location restriction associated with a service is included in the bearer tag 105 as a location validation identifier as illustrated in Table 1. Table 1 also includes a validity date associated with each identifier. The validity date indicates the effective date or dates for the location restriction.

TABLE 1

| Location Validation Identifier | Area | Continent | Validity Date |
|---|---|---|---|
| 1-10000 | Atlanta, GA | North America | 2009 |
| 10001-20000 | New York, NY | North America | 2009 |
| 20001-30000 | Washington, DC | North America | 2009 |
| 30001-40000 | Dallas, TX | North America | 2009 |

In certain embodiments, it is contemplated that the services platform 107 may also use criteria other than location to validate a service management request originating from a bearer tag 105. For example, the services platform 107 can determine whether a service associated with a particular bearer tag 105 has already been activated or otherwise previously used. In one further embodiment, the services platform 107 can link a particular bearer tag 105 to a UE 101 by, for example, associating a bearer tag ID with the unique identifier corresponding to the UE 101 (e.g., international mobile equipment identity (IMEI)).

At 509, the services platform 107 receives a response message from the user. If the response confirms the service management request, the services platform 107 initiates the requested service management actions (at 511). In exemplary embodiments, the process of initiating the actions includes initiating the collection of appropriate payment for the service management request according to the methods of payment collection described with respect to the payment gateway 227 of FIG. 2B.

Figure 6:
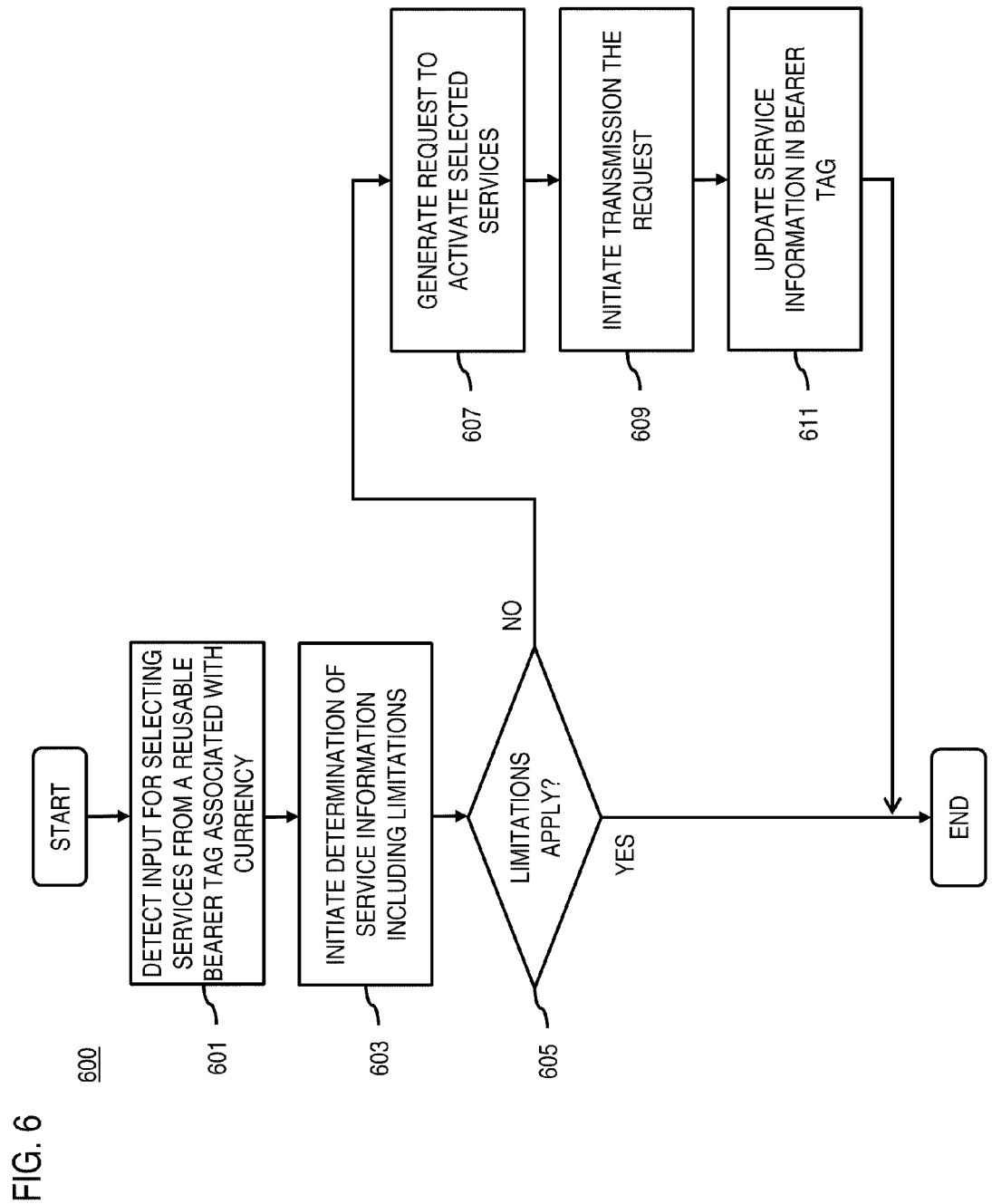
FIG. 6 is a flowchart of a process for activating a service using a reusable prepaid bearer tag, according to an exemplary embodiment.

FIG. 6 is a flowchart of a process for activating a service using a reusable prepaid bearer tag, according to an exemplary embodiment. In one embodiment, the services management module 111 performs the process 600 and is implemented in, for instance, a chip set including a processor and a memory as shown FIG. 19. In step 601, the services management module 111 detects an input for a user for selecting one or more services corresponding to a prepaid bearer tag 105 (e.g., an NFC enable card) that is reusable by another user. By way of example, the prepaid bearer tag 105 may be associated with one or more services from which the user may select to use the prepaid currency, such as monetary value, specified by the prepaid bearer tag 105. For instance, a prepaid bearer tag 105 may specify a prepaid value of $30 that may be spent on any one of five services listed on the tag. It is also contemplated that, in certain embodiments, the prepaid bearer tag 105 is not limited to any particular service or services and instead, may be used for engaging any service available to the UE 101 over the communication network 103.

In exemplary embodiments, the prepaid bearer tag 105 specifies a first amount of prepaid currency for a first user and a second amount of prepaid currency for the second and subsequent users. In one embodiment, the first amount and any subsequent amounts associated with other users are from a common pool of currency associated with the prepaid bearer tag 105. In other words, the all users of the prepaid bearer tag 105 share the prepaid amount of currency specified by the bearer tag 105 with all users of the prepaid bearer tag 105. For example, a bearer tag 105 has a prepaid value of $30. A first user uses, for example, $10 to engage a service, leaving $20 for subsequent users of the bearer tag 105. In another embodiment, the prepaid value of a bearer tag 105 can be tracked independently for each user of the bearer tag 105. For example, in the case of the same $30 prepaid bearer tag 105, a first user uses $10 to engage a service and passes the bearer tag to a second user. When the second user uses the same prepaid card, the second user will have access to the original $30 prepaid value regardless of what services the first user has already engaged. Meanwhile, the prepaid balance with respect to the first would remain at $20 regardless of the actions of the second user. In this way, a prepaid bearer tag 105 may be reused by other users even when the prepaid value has been depleted by a first user. This advantageously enables the provider of the card to recycle bearer tags and encourage users to distribute them to friends and acquaintances for greater service penetration.

As described with respect to FIG. 3, the services management module detects the user input for selecting one or more services by, for instance, receiving a signal via the bearer tag reader control module 203 that a bearer tag 105 has been detected. The services management module 111 then initiates determination of the service information associated the one or more services selected by the user (step 603). For example, the service information includes at least in part a service code corresponding to each of the one or more selected services, the prepaid value or balance of the prepaid value (e.g., the first amount of currency associated with the user and the second amount of currency associated with other users), predetermined limitations on the activation of the one or more selected services or on the use of the prepaid amount of currency, or any combination thereof. In exemplary embodiments, the predetermined limitations include (1) a limitation on the number of uses of the same bearer tag 105, e.g., determined by an activation counter on the number of activations performed using the same bearer tag 105; (2) a temporal limitation for using the prepaid bearer tag 105, e.g., the prepaid bearer tag 105 is valid only for a defined period of time; (3) a location limitation, e.g., the prepaid bearer tag 105 is valid only when the user is at certain locations; (4) a device type limitation, e.g., the prepaid bearer tag 105 and/or applications/services on the tag are valid only when accessed by a certain device type; (5) a user mobile account type of limitation, e.g., the prepaid bearer tag 105 and/or the applications/services on the tag are valid only when accessed by a certain type of the user mobile account; (6) or a combination thereof. By way of example, the restrictions associated with the tags and/or the applications/services are included in the bearer tag 105 as related validation identifiers. When the user equipment 101 accesses the tag 105, it also at the same time receives one or more validation identifiers. The services management module 111 then, for instance, compares the validation identifiers with related identifiers stored in the user equipment 101 and approves use of the tag and/or the applications/services based on the comparison. Alternatively, the user equipment 101 may transmit one or more the validation identifiers to, for instance, the services platform 107 to compare the validation identifiers with related user equipment identifiers and approve use of the tag and/or the applications/services. It is contemplated that any other limitations, including those described with respect to service validation described with respect to FIG. 5, may be specified.

After determining the service information and any corresponding limitations, the services management module 111 determines whether any of the corresponding limitations apply (step 605). For example, the services management module 111 checks the activation counter in the service information to determine a number of times the bearer tag 105 has been used. If the number of activations has reached a predetermined limit, the prepaid bearer tag 105 may no longer be used. As part of the limitations check, the services management module 111 may also determine whether there is any remaining balance of the prepaid value remaining. If the prepaid value is from a common pool of currency, the card may no longer be used by any user once the prepaid value reaches zero. If the prepaid value is tracked independently per user, the user will no longer be able to use the prepaid bearer tag 105 when value reaches zero with respect to the user. Other users may be able to use the independently tracked prepaid bearer tag 105 depending on the prepaid balance with respect to the particular user.

If no limitations specified by the service information apply and the prepaid balance is not zero, the services management module 111 generates a service management request to activate the one or more services selected by the user (step 607). The module 111 then initiates transmission of the request to the services platform 107 for activation and billing against the prepaid value of the bearer tag 105 (step 609). If the prepaid value of the bearer tag 105 is not sufficient cover the complete cost of the selected services, the remaining balance may be billed according to the predetermined billing arrangement as described with respect to FIG. 3. In addition or alternatively, the services management module 111 can inform the user of the shortfall and request confirmation to pay for the selected services using predetermined billing arrangements. On confirmation of the activation of the selected services, the services management module 111 initiates an update of the corresponding service information in the prepaid bearer tag 105. By way of example, the module 111 updates the prepaid balance to reflect the cost of the selected services. The module 111 also updates the activation counter to reflect the number of times the bearer tag 105 has been used. If the bearer tag 105 is an active tag, the services management module 111 may directly write the updated service information to the tag 105 itself. If the bearer tag 105 is a passive tag, the services management module 111 updates the service information stored in, for instance, the services platform 107 and/or the network billing system 109.

Figure 7:
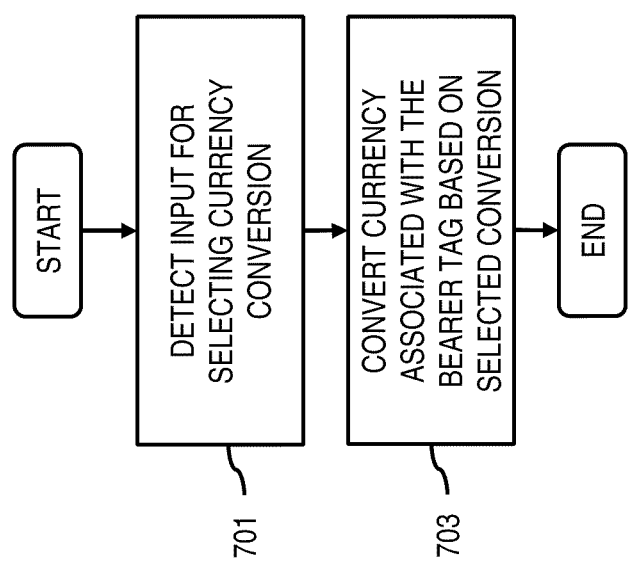
FIG. 7 is a flowchart of a process for converting the currency of a reusable prepaid bearer tag, according to an exemplary embodiment.

FIG. 7 is a flowchart of a process for converting the currency of a reusable prepaid bearer tag, according to an exemplary embodiment. In one embodiment, the services management module 111 performs the process 300 and is implemented in, for instance, a chip set including a processor and a memory as shown FIG. 19. In step 701, the services management module 111 detects an input from a user for selecting a currency conversion for the prepaid value associated with a prepaid bearer tag 105. In exemplary embodiments, the prepaid value may be specified in any form of currency. For example, the currency may be a monetary value (e.g., dollars, Euros, pounds) or a proprietary currency (e.g., in-game or in-service credits) used for one or more services. Consequently, the prepaid value can be converted to a currency appropriate for a particular location (e.g., when used in Europe versus when used in the United States) or a particular service (e.g., converting a dollar amount into credits used in a music store).

It is contemplated that the input may be specified by any mechanism including, for instance, tapping on a currency conversion tag. For example, the tag may be included on the same NFC card as the prepaid bearer tag 105. In other embodiments, the currency conversion tag may be presented independently of the prepaid bearer tag 105. It is also contemplated that the currency conversion request may be initiated by tapping on contextual items that are appropriated tagged. For example, tapping on a portable music player configured with a bearer tag can initiate a request to convert the prepaid currency to a currency (e.g., credits) used in a music store. On receiving the input, the services management module 111, for instance, converts the currency as directed (step 703) and displays the converted amount on the UE 101. The converted amount may also be used to update the service information in the prepaid bearer tag 105 so that subsequent reading of the service information will be in the converted currency.

Figure 8A:
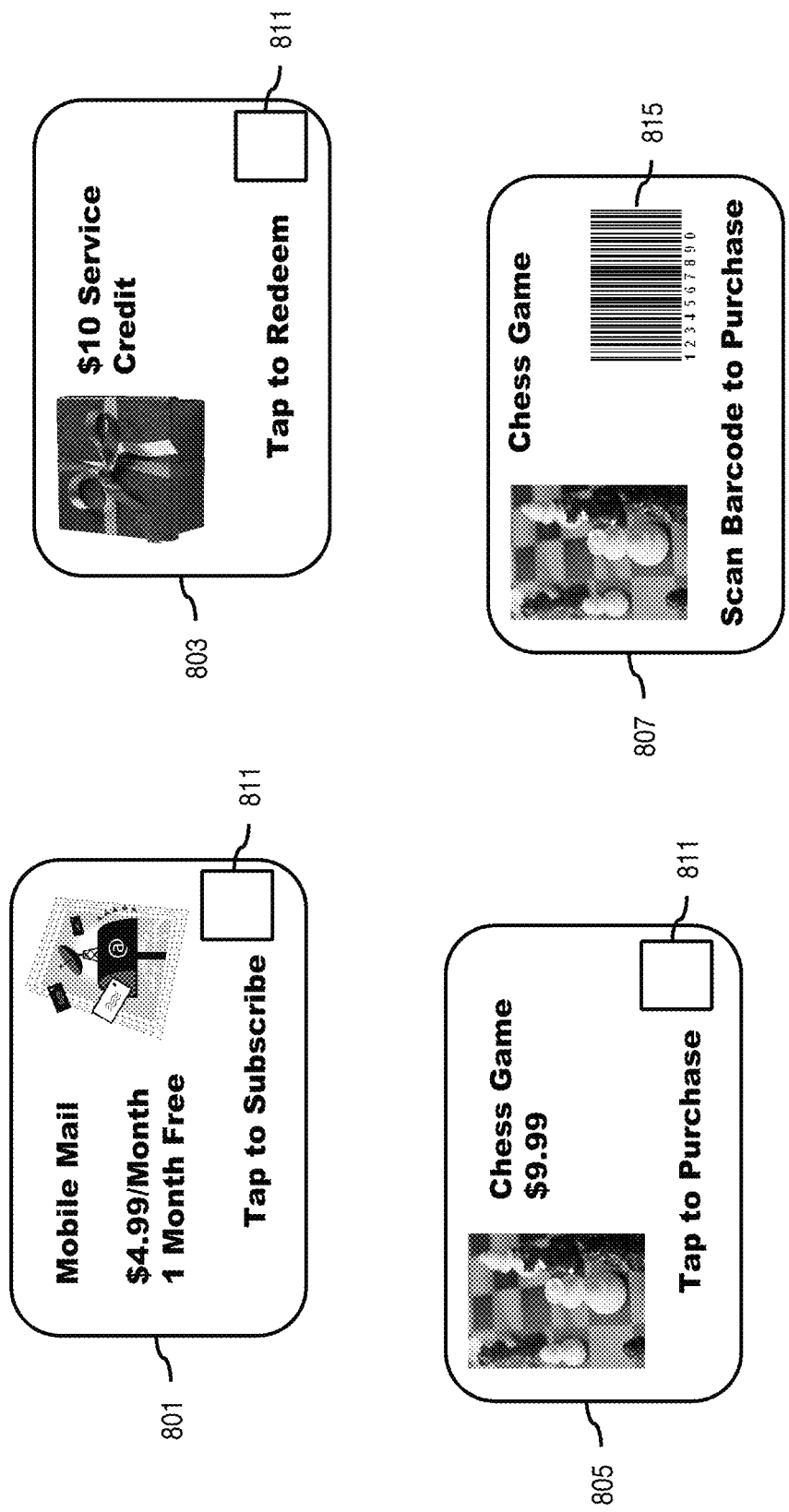
FIGS. 8A and 8B are diagrams of bearer tags and corresponding services, according to an exemplary embodiment.
Figure 8B:
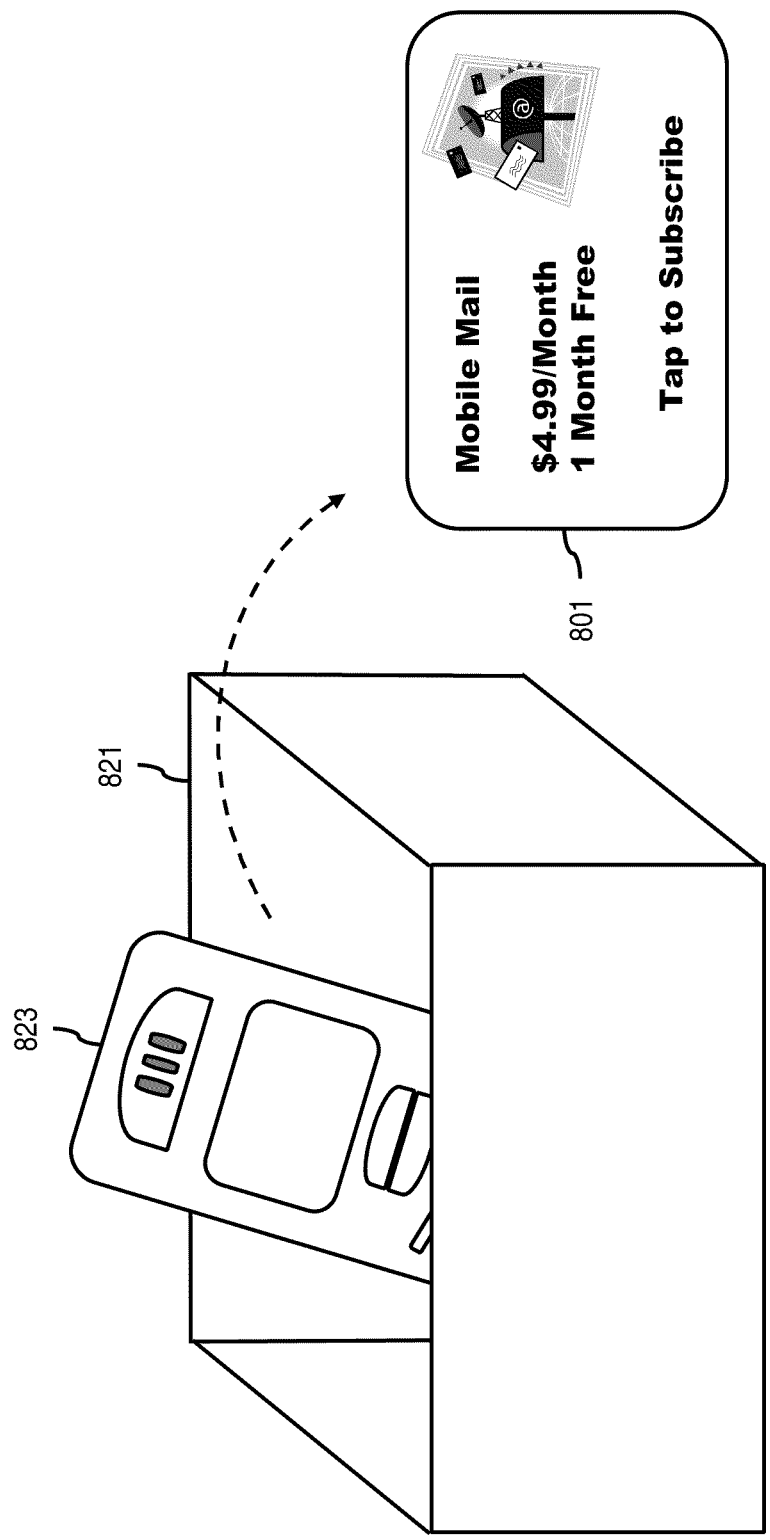

FIGS. 8A and 8B are diagrams of bearer tags and corresponding services, according to an exemplary embodiment. As shown in FIG. 8A, the bearer tags 801-807, for example, correspond to a variety of services and may use different types of bearer tags. For instance, bearer tags 801-805 include a wireless tag 809 (e.g., NFC, RFID, or contactless card), whereas bearer tag 807 includes a barcode tag 811. Moreover, the bearer tag 801 corresponds to an E-mail subscription service, the bearer tag 803 corresponds to a service credit that can be immediately applied to a user's phone bill, and bearer tags 805 and 807 correspond to the purchase a game (e.g., chess).

In one embodiment, the billing information for the service may be printed or displayed on the tag itself (e.g., bearer tags 801-805). In other embodiments (e.g., bearer tag 807), the billing information is not display on the tag. Instead, the tag 807 can be configured, for instance, to display the billing information when the tag is read.

In another embodiment, the bearer tag may be configured to activate any dependent features (e.g., a data plan) in addition to the requested service. For example, bearer tag 801 may be used to subscribe to a Mobile Mail e-mail service. In this example, the services platform 107 is configured to require a data plan when subscribing to the Mobile Mail service. On activation of the tag 801 by a UE 101, the services platform automatically initiates subscription to a data plan along with activating the service if the UE 101 does not already have a data plan.

Although the bearer tags are displayed in FIG. 8A as cards, it is contemplated that the bearer tags 801-807 may take any form capable of being embedded or printed with a bearer tag.

FIG. 8B is a diagram depicting a distribution method for a bearer tag, according to an exemplary embodiment. It is contemplated that the bearer tags 801-807 of FIG. 8A may be distributed using any suitable method (e.g., distribution within a user equipment box, with a monthly billing statement, in print advertisements, etc.). As shown in FIG. 8B, the Mobile Mail bearer tag 801 is included in the user equipment box 821 with the UE 823. For instance, the bearer tag 801 may be placed in the user equipment box 821 at the time of equipment purchase.

Table 2 summarizes the exemplary services and features associated with a bearer tag 105 in relation to the mechanism for distributing the bearer tag 105 and the dependent features already installed on the UE 101 as discussed with respect to FIGS. 8A and 8B. Scenario 1 includes a UE 101 preconfigured to include an application corresponding to a service (e.g., an E-mail application). The UE 101, however, does not have a data plan. In this scenario, a bearer tag 105 corresponding to, for instance, an E-mail service may be included in the equipment box to promote the use of a data plan with the service. The user initiates the service and the corresponding data plan via the bearer tag 105. Payment, for example, may then be made via a premium SMS (PSMS) message.

Scenario 2 is similar to scenario 1 with the exception that the UE 101 has already been provisioned with a data plan feature. This scenario, for instance, may be used to promote an E-mail service, instant messaging service, or games. In this case, the user merely has to activate and pay for the service using, for example, a wireless application protocol (WAP) billing page. This payment for be scheduled to automatically recur on a periodic basis (e.g., monthly) to maintain the service.

Scenario 3 includes a UE 101 that does not have an application corresponding to a service already installed on the device. The UE 101 also does not have a data plan feature already enabled. In this scenario, a bearer tag 105 that is distributed either in the equipment box or by other means may be used to initiate the service, download the corresponding application, and enable the dependent feature (e.g., a data plan). Under this scenario, the user may initiate payment for the service via, for example, an SMS short code or a WAP link.

Scenario 4 is similar to scenario 3 with the exception that the UE 101 already has the data plan feature provisioned on the device. In this case, the UE 101 may initiate a service and download of the corresponding application by the one tap method (i.e., single tapping the UE 101 on the bearer tag 105). A second or subsequent tap may then, for instance, initiate payment for the service or activate the service and any corresponding downloaded application.

Scenario 5 is similar to scenario 4 with the exception that the data plan already provisioned on the UE 101 is not adequate to take full advantage of the service (e.g., a premium video service require additional bandwidth). In this case, the user can initiate the service and upgrade to the recommended data plan feature using a bearer tag 105. The bearer tag 105, for example, may be sent to user by mail with the phone bill.

TABLE 2

|  | User has no data plan feature | User has data plan feature | User needs to upgrade data plan feature to use service |
|---|---|---|---|
| Application corresponding to service is already on the UE 101; Bearer tag is distributed in the box | Scenario (1): Bearer tag 105 is used to advertise a data plan while pushing for user activation of a service (e.g., E-mail) pre-loaded in phone with payment via PSMS. | Scenario (2): Bearer tag 105 is linked to a wireless application protocol (WAP) billing page to bill or PSMS to bill for service usage on a periodic basis (e.g., monthly). |  |
| Application corresponding to service is not preloaded on the UE 101; Bearer tag is distributed in or out of the box | Scenario (3): Bearer tag 105 is used to trigger authorization to download an application corresponding to the service via an SMS short code. Payment may be made via a WAP link reversed billed by the carrier or service provider. | Scenario (4): Bearer tag 105 is used to point to a secure web link to download an application corresponding to the service via a single tap. A second or subsequent tap can be configured to initiate payment after the application is installed or to activate the service and any corresponding downloaded application. | Scenario (5): Bearer tag 105 is used to upgrade the data plan for better service (e.g., premium video service). The bearer tag 105 may be sent by mail with the phone bill as advertising material. |

Figure 9:
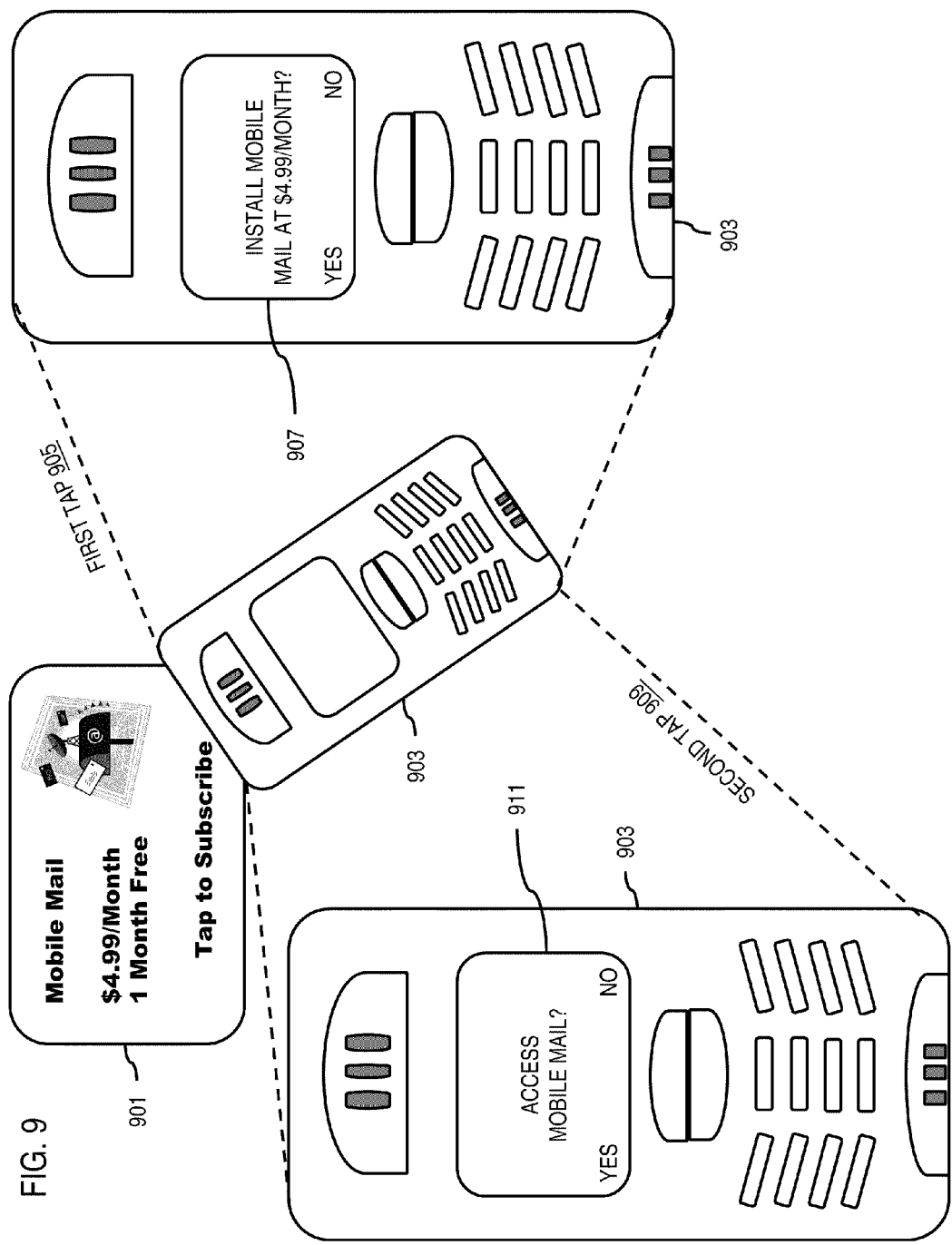
FIG. 9 is a diagram of a user interface utilized in the processes of FIGS. 4-6, according to an exemplary embodiment.

FIG. 9 is a diagram of a user interface utilized in the processes of FIGS. 4-6, according to an exemplary embodiment. In an exemplary embodiment, a bearer tag 901 (e.g., containing an NFC tag) is inserted in to the phone packaging for easy access by the user. In this example, the bearer tag 901 corresponds to an E-mail subscription service costing $4.99 per month with one month free on activation. The user of device 903 initiates a request to activate the E-mail service by tapping the device 903 on or near the bearer tag 901. The device 903 reads the NFC tag and requests activation of the service via, for example, the services platform 107. If this is a first tap 905 by the device 903 on the bearer tag 901, the services platform 107 processes the request and activates the service according to a predetermined billing arrangement (e.g., bill the service directly to the user's phone bill). The services platform 107 displays a confirmation message 907 presenting the billing information and asking for the user's consent to proceed with the subscription. The user may respond yes to finalize the service activation and agree to the billing arrangement or no to cancel the request. If the tap is a second tap 909 (or subsequent tap), the service platform 107, for instance, interprets the second tap 909 as a request to activate the service along with any corresponding application. Accordingly, the services platform 107 displays a message 911 requesting confirmation to access the service and the application. In this way, the user can use the bearer tag 901 to easily access the service following activation.

Figure 10:
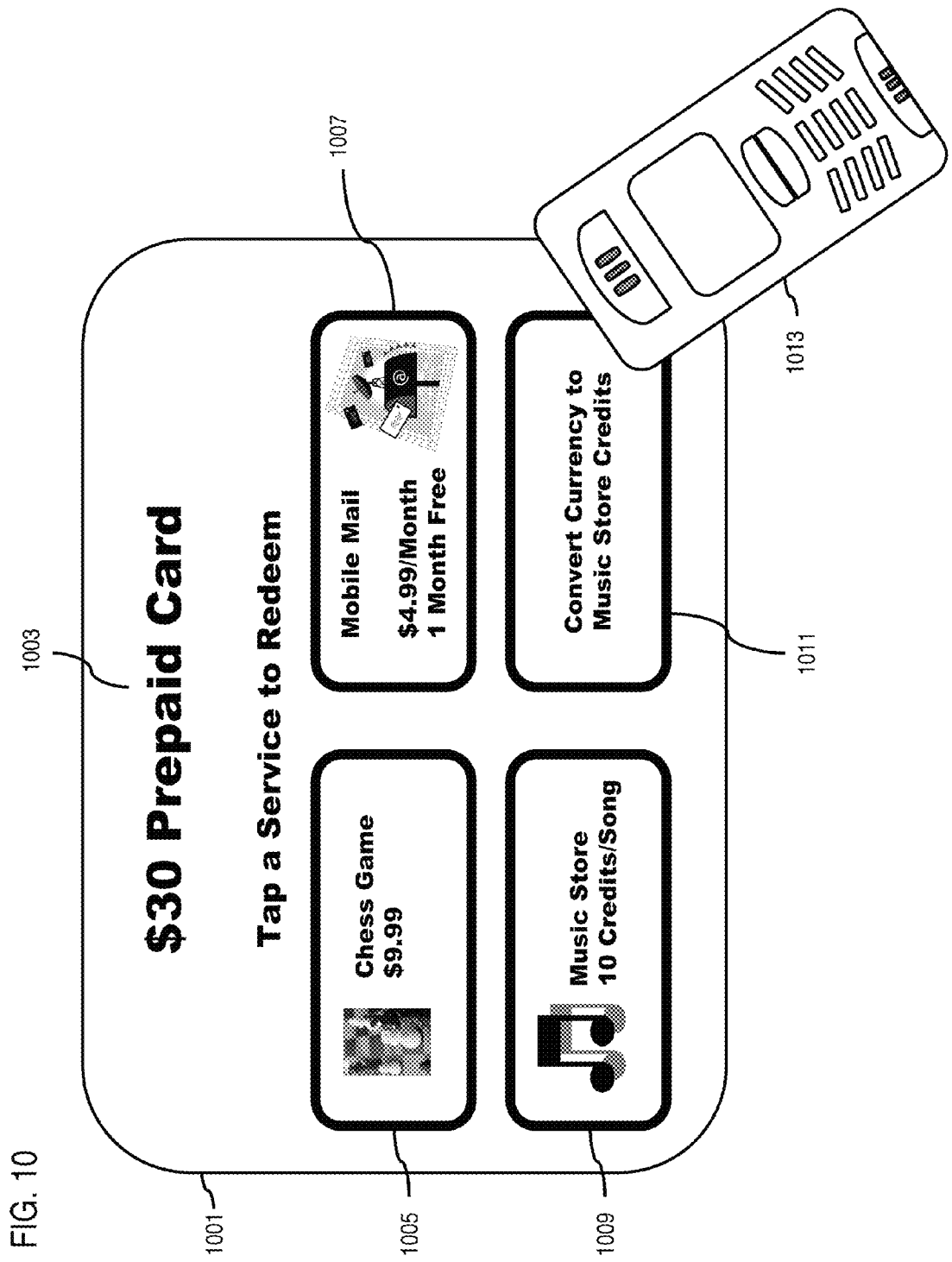
FIG. 10 is a diagram of a reusable prepaid bearer tag, according to an exemplary embodiment.

FIG. 10 is a diagram of a reusable prepaid bearer tag, according to an exemplary embodiment. As shown, the bearer tag 1001 is a prepaid bearer tag 105. For example, the prepaid bearer tag 105 specifies a prepaid value 1003 of $30 that may be redeemed for one or three listed services (e.g., a chess game 1005, a mobile mail service 1007, and a music store service 1009). The bearer tag 105 also includes a currency conversion selection area 1011 for converting the prepaid value from $30 to the equivalent value expressed as music store credits. In one embodiment, each area of the bearer tag 105 includes a separate wireless tag (not shown) associated with the area so that a tap by the UE 101 (e.g., mobile device 1013) will initiate a corresponding action. For example, tapping on the prepaid value 1003 can display the current balance on the card. Tapping on any of the three services will activate each respective service. Additionally, the wireless tags 1005, 1007, 1009 and 1011 can be connected to each other. Tapping on the currency conversion selection 1011 will initiate conversion of the prepaid dollar amount to a music store credit amount.

The described processes and arrangement advantageously, according to certain embodiments, provide a rapid and convenient mechanism for a user to identify and subscribe to services, for example, to install and configure an application at the first tap, ignore otherwise, if installed, use to automatically start the application at each tap, ignore otherwise, if the application is running, use once to load new application/service credit, ignore otherwise.

FIGS. 11-16 are time sequence diagrams that illustrate sequences of messages and processes of use case scenarios, according to various exemplary embodiments. A network process on the network is represented by a shaded vertical box. A message passed from one process to another is represented by horizontal arrows. A step performed by a process is indicated by the text.

The processes represented in FIGS. 11-15 are a consumer device 1101, an NFC application 1103 in the consumer device 1101, an NFC tag 1105, a store front 1107, a payment gateway 1109, an operator access point 1111, and an operator billing system 1113. The consumer device 1101 is an example of a UE 101. The NFC application 1103 is an example of a services management module 111. The NFC tag 1105 is an example of a bearer tag 105. The store front 1107 is an example of the services portal 221 (e.g., the Nokia Ovi Store). The payment gateway 1109 is an example of the payment gateway 227. The operator access point 1111 is an example of an access point to communication network 103. The operator billing system 1113 is an example of the network billing system 109. The payment gateway 1109, operator access point 1111 and/or operator billing system 1113 are together an example of service system, server system or service provider. Additionally, the payment gateway 1109 may be included in the service system, server system, service provider, or the store front 1107.

Figure 11B:
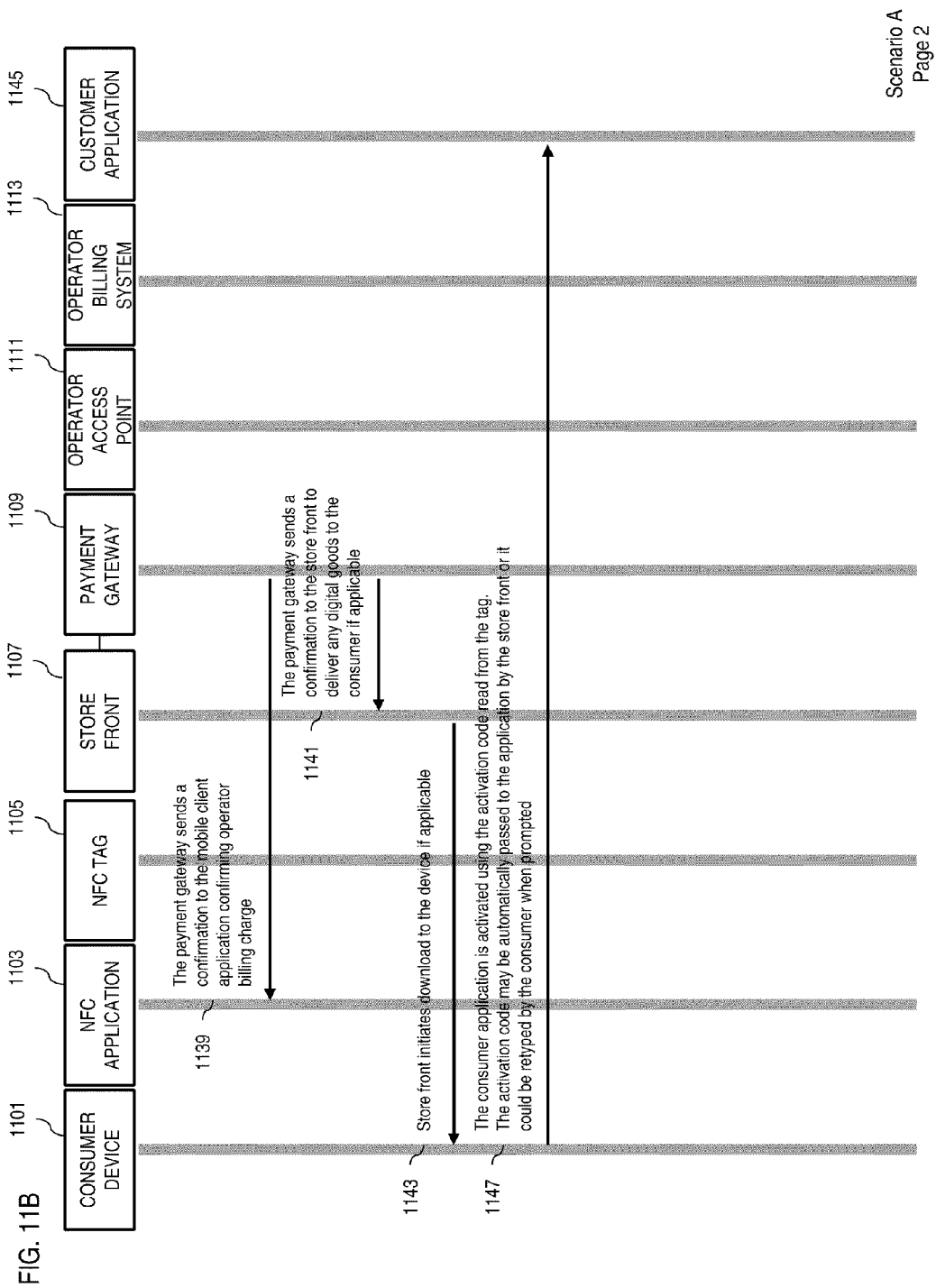

FIGS. 11A and 11B are time sequence diagrams that illustrate a sequence of messages and processes for managing a service including an application download, according to various exemplary embodiments. At 1115, the consumer device 1101 is tapped on the NFC tag 1105 to activate a service. In response, the NFC application 1103 negotiates with the NFC tag 1105 (at 1117) to request the service information from the NFC tag 1105 (at 1119). The NFC application 1103 then reads and decrypts the service information from the NFC tag 1105 (at 1121).

In this example, the service information includes an activation code for a service and a promotion code to apply towards the service billing charge. At 1123, the NFC application 1103 reads the service information and interprets it as an activation code and a promotion code, and sends the service information to the store front 1107 via an SMS message.

On receipt of the message, the store front 1107 interprets the service information as a service activation code for a service and sends a confirmation request to the consumer device 1101 (at 1125). The confirmation message, for instance, contains the billing price for the service taking into account the promotion code.

Upon confirmation from the user to activate the service and to apply the charges to the user's phone bill, the NFC application 1103 sends a request to the payment gateway 1109 to send information on the SMS short code and transaction details for the service (at 1127). Accordingly, the payment gateway 1109 generates a unique transaction ID and sends the ID and the associated SMS short code to the NFC application 1103 (at 1129). The NFC application 1103 initiates payment for the service by initiating an SMS message containing the transaction ID addressed to the SMS short code corresponding to the operator billing system 1113 (at 1131). The SMS is forwarded to the operator billing system 1113 via the operator access point 1111 (at 1133).

After receiving the SMS message, the operator billing system 1113 forwards the message along with the MSISDN number corresponding to the consumer device 1101 to the payment gateway 1109 (at 1135). The payment gateway 1109 matches the transaction ID sent to the client at 1129 with the transaction ID received from the operator billing system 1113, and initiates a premium rate SMS (PSMS) message to the operator billing system 1113 (at 1137). The payment gateway 1109 also sends confirmation of the billing charge to the NFC application 1103 (at 1139) and confirmation to the store front 1107 to deliver any digital goods associated with the service (at 1141).

If applicable, the store front 1107 initiates download of any application or other digital content to the consumer device 1101 (at 1143). The downloaded application 1145 is activated using the activation code read from the NFC tag 1105. The activation code may also be automatically passed to the NFC application 1103 by the store front 1107 or it may be manually entered by the consumer when prompted (at 1147).

Figure 12A:
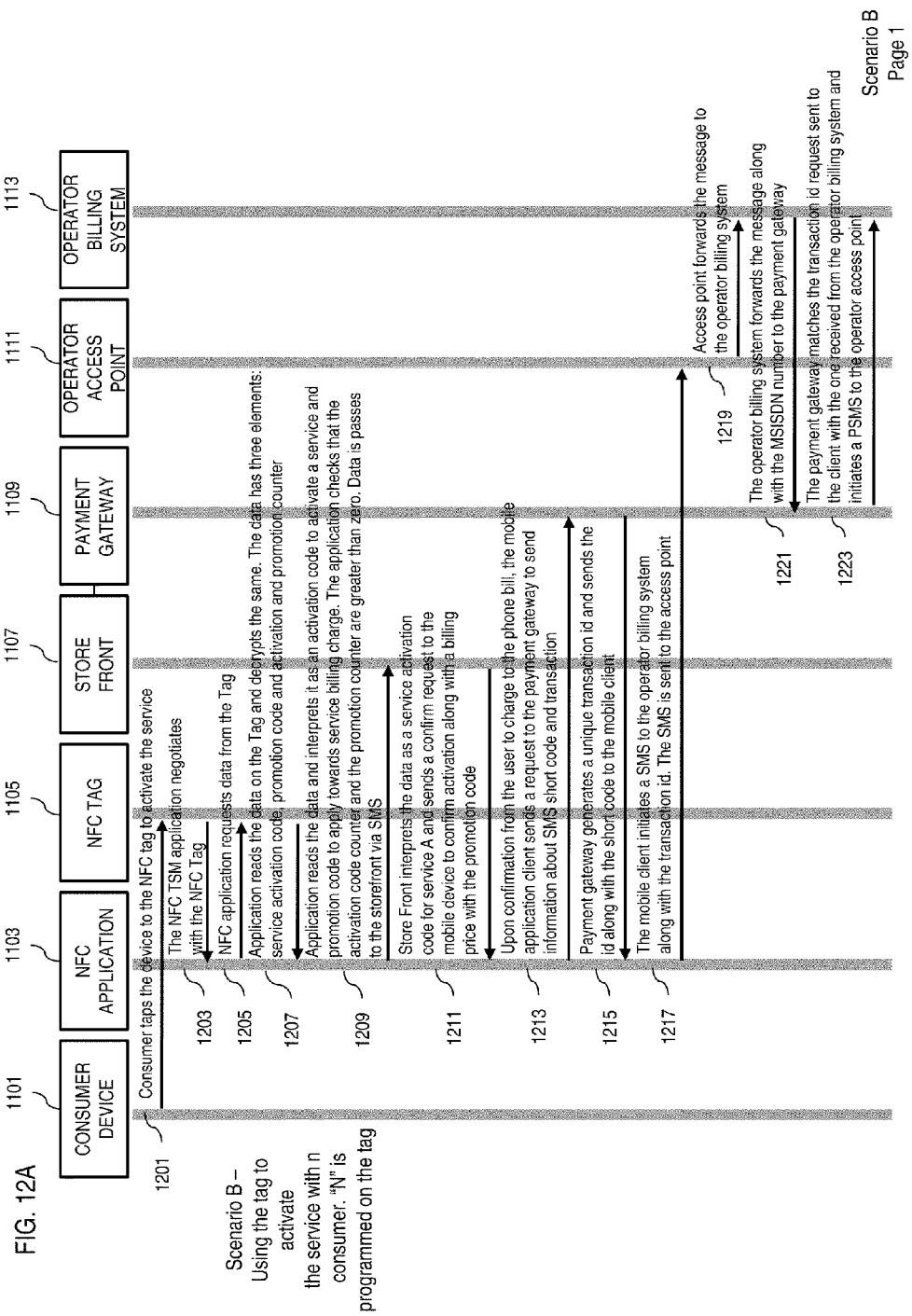
FIGS. 12A and 12B are time sequence diagrams that illustrate a sequence of messages and process for managing a service including a limited number of activations, according to various exemplary embodiments.
Figure 12B:
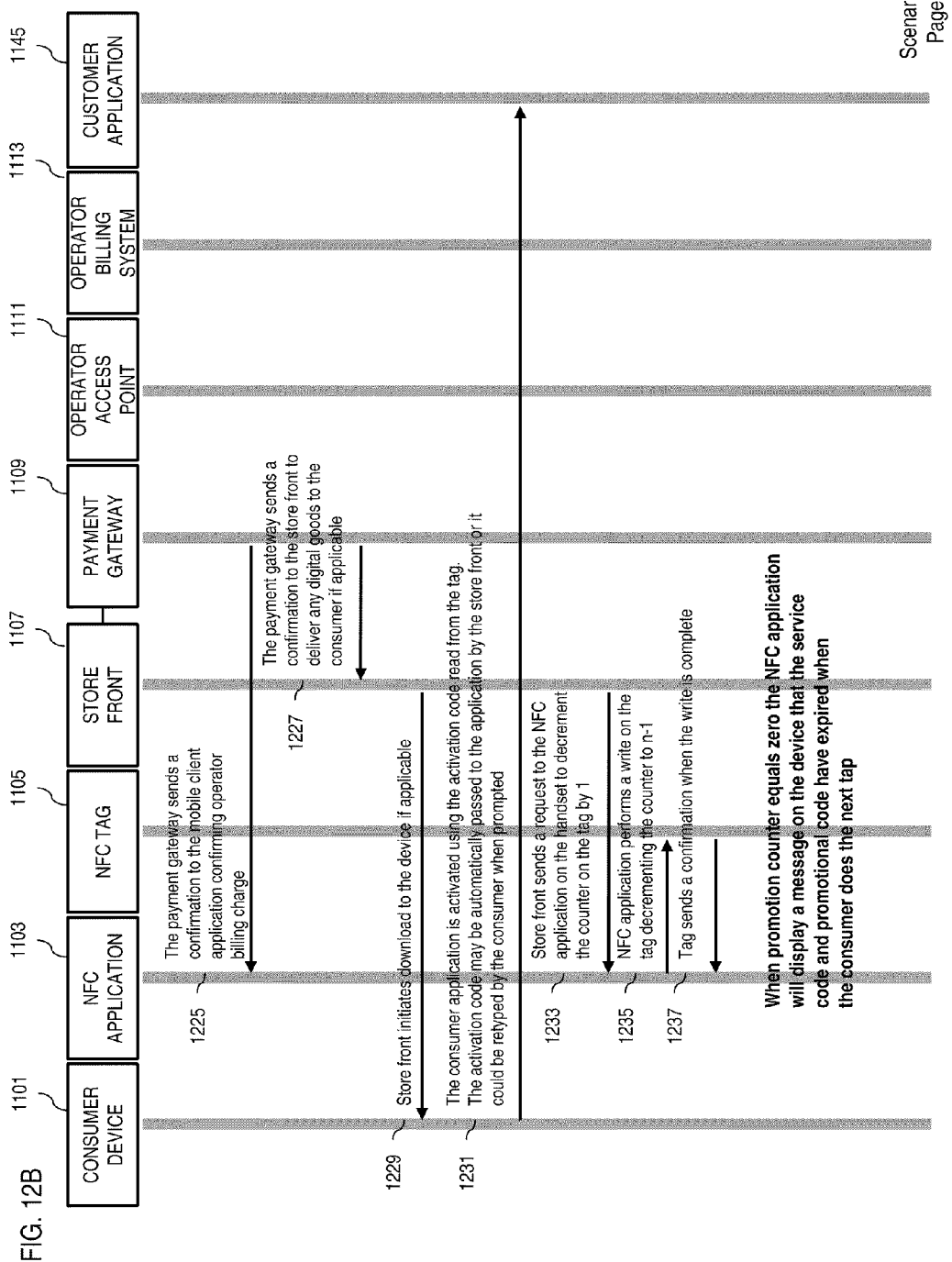

FIGS. 12A and 12B are time sequence diagrams that illustrate a sequence of messages and process for managing a service including a limited number of activations, according to various exemplary embodiments. At 1201, a consumer device 1101 is tapped on the NFC tag 1105 to activate a service. In response, the NFC application 1103 negotiates with the NFC tag 1105 (at 1203) to request the service information from the NFC tag 1105 (at 1205). The NFC application 1103 then reads and decrypts the service information from the NFC tag 1105 (at 1207).

In this example, the service information includes three elements: a service activation code, promotion code, and a promotion counter. The promotion counter, for instance, limits the number of consumers who can activate the service. At 1209, the NFC application 1103 reads the service information and interprets it as an activation code to activate a service, a promotion code, and a promotion counter. The NFC application 1103 checks that the activation code counter and the promotion counter are greater than zero. If they are, the NFC application 1103 passes the service information to the store front 1107 via an SMS message.

On receipt of the message, the store front 1107 interprets the service information as a service activation code for a service and sends a confirmation request to the consumer device 1101 (at 1211). The confirmation message, for instance, contains the billing price for the service taking into account the promotion code.

Upon confirmation from the user to activate the service and to apply the charges to the user's phone bill, the NFC application 1103 sends a request to the payment gateway 1109 to send information on the SMS short code and transaction details for the service (at 1213). Accordingly, the payment gateway 1109 generates a unique transaction ID and sends the ID and the associated SMS short code to the NFC application 1103 (at 1215). The NFC application 1103 initiates payment for the service by initiating an SMS message containing the transaction ID addressed to the SMS short code corresponding to the operator billing system 1113 (at 1217). The SMS is forwarded to the operator billing system 1113 via the operator access point 1111 (at 1219).

After receiving the SMS message, the operator billing system 1113 forwards the message along with the MSISDN number corresponding to the consumer device 1101 to the payment gateway 1109 (at 1221). The payment gateway 1109 matches the transaction ID sent to the client at 1129 with the transaction ID received from the operator billing system 1113, and initiates a premium rate SMS (PSMS) message to the operator billing system 1113 (at 1223). The payment gateway 1109 also sends confirmation of the billing charge to the NFC application 1103 (at 1225) and confirmation to the store front 1107 to deliver any digital goods associated with the service (at 1227). If applicable, the store front 1107 initiates download of any application or other digital content to the consumer device 1101 (at 1229). The downloaded application 1145 is activated using the activation code read from the NFC tag 1105. The activation code may also be automatically passed to the NFC application 1103 by the store front 1107 or it may be manually entered by the consumer when prompted (at 1231).

In addition, the store front 1107 sends a request to the NFC application 1103 on the consumer device 1101 to decrement the promotion counter on the NFC tag 1105 by one (at 1233). In response, the NFC application 1103 performs a write operation on the NFC tag 1105 to decrement to counter by one (at 1235). The NFC tag 1105 sends a confirmation to the NFC application 1103 when the write operation is complete (at 1237). When the promotion counter reaches zero the NFC application 1103 displays a message on the device that the service code and promotion code have expired when the consumer next taps the NFC tag 1105.

Figure 13A:
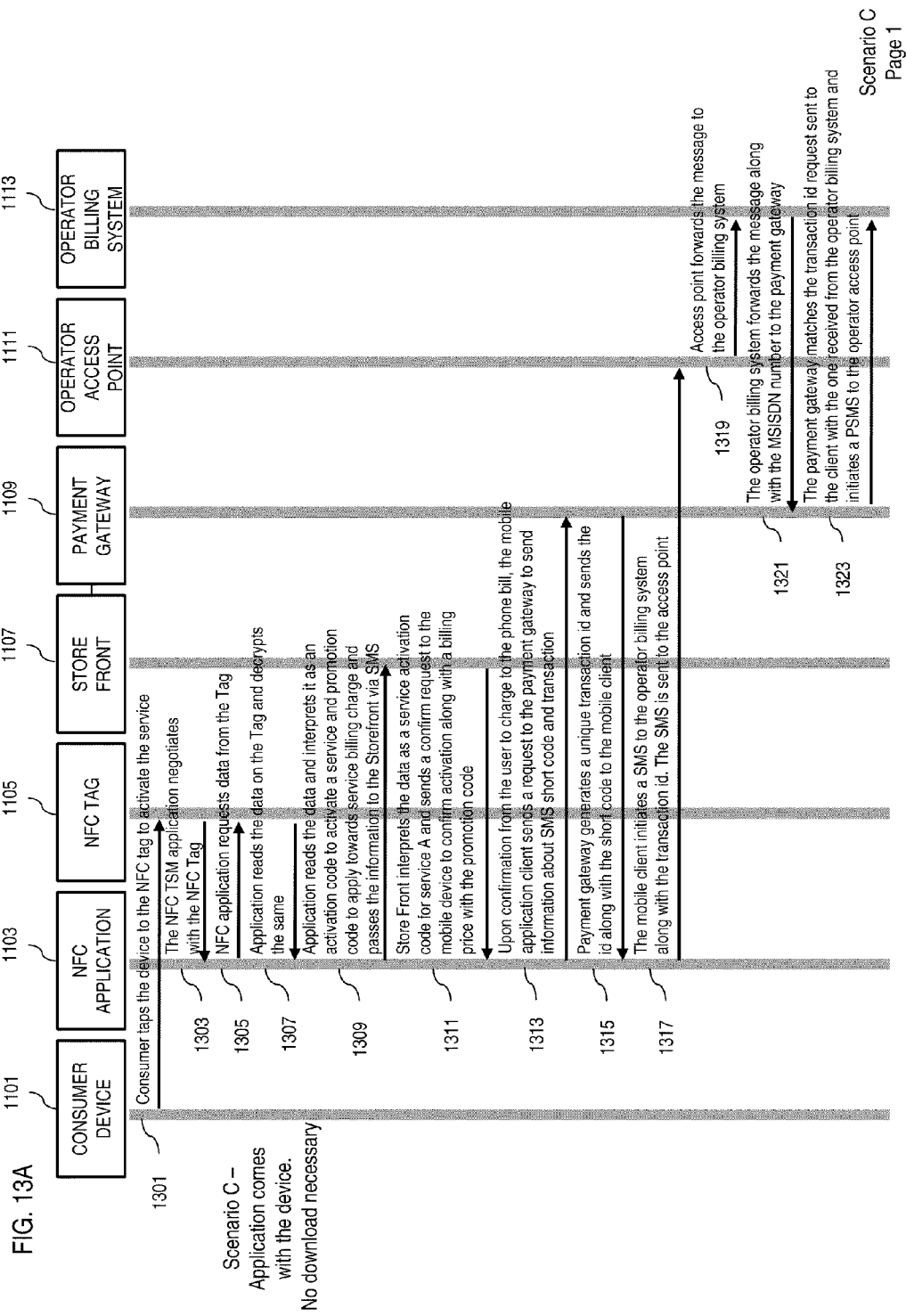

FIGS. 13A and 13B are time sequence diagrams that illustrate a sequence of messages and processes for management a service including an application resident on a user equipment, according to various exemplary embodiments. At 1301, a consumer device 1101 is tapped on the NFC tag 1105 to activate a service. In response, the NFC application 1103 negotiates with the NFC tag 1105 (at 1303) to request the service information from the NFC tag 1105 (at 1305). The NFC application 1103 then reads and decrypts the service information from the NFC tag 1105 (at 1307).

In this example, the service information includes an activation code for a service and a promotion code to apply towards the service billing charge. At 1309, the NFC application 1103 reads the service information and interprets it as an activation code and a promotion code, and sends the service information to the store front 1107 via an SMS message.

On receipt of the message, the store front 1107 interprets the service information as a service activation code for a service and sends a confirmation request to the consumer device 1101 (at 1311). The confirmation message, for instance, contains the billing price for the service taking into account the promotion code.

Upon confirmation from the user to activate the service and to apply the charges to the user's phone bill, the NFC application 1103 sends a request to the payment gateway 1109 to send information on the SMS short code and transaction details for the service (at 1313). Accordingly, the payment gateway 1109 generates a unique transaction ID and sends the ID and the associated SMS short code to the NFC application 1103 (at 1315). The NFC application 1103 initiates payment for the service by initiating an SMS message containing the transaction ID addressed to the SMS short code corresponding to the operator billing system 1113 (at 1317). The SMS is forwarded to the operator billing system 1113 via the operator access point 1111 (at 1319).

After receiving the SMS message, the operator billing system 1113 forwards the message along with the MSISDN number corresponding to the consumer device 1101 to the payment gateway 1109 (at 1321). The payment gateway 1109 matches the transaction ID sent to the client at 1129 with the transaction ID received from the operator billing system 1113, and initiates a premium rate SMS (PSMS) message to the operator billing system 1113 (at 1323). The payment gateway 1109 also sends confirmation of the billing charge to the NFC application 1103 (at 1325) and confirmation to the store front 1107 to deliver any digital goods associated with the service (at 1327).

The store front determines that the application associated with the service is already installed on the consumer device 1101 and sends the application activation code to the device 1101 (at 1329). The activation code may be automatically passed to the NFC application 1103 by the store front 1107 or it may be manually entered by the consumer when prompted (at 1331).

FIGS. 14A and 14B are time sequence diagrams that illustrate a sequence of messages and processes for management a service including an application that requires subscription to another feature, according to various exemplary embodiments. At 1401, a consumer device 1101 is tapped on the NFC tag 1105 to activate a service. In response, the NFC application 1103 negotiates with the NFC tag 1105 (at 1403) to request the service information from the NFC tag 1105 (at 1405). The NFC application 1103 then reads and decrypts the service information from the NFC tag 1105 (at 1407).

In this example, the service information includes an activation code for a service and a promotion code to apply towards the service billing charge. At 1409, the NFC application 1103 reads the service information and interprets it as an activation code and a promotion code, and sends the service information to the store front 1107 via an SMS message.

On receipt of the message, the store front 1107 interprets the service information as a service activation code for a service and sends a confirmation request to the consumer device 1101 (at 1411). The confirmation message, for instance, contains the billing price for the service taking into account the promotion code. In addition, the confirmation message identifies any features that are required as part of the service. For example, an e-mail service requires subscription to a data plan. If the consumer device 1101 does not already have the feature (e.g., data plan) already configured, the store front 1107 includes the feature and associated billing information in the confirmation message.

Upon confirmation from the user to activate the service (and any additional features if applicable) and to apply the charges to the user's phone bill, the NFC application 1103 sends a request to the payment gateway 1109 to send information on the SMS short code and transaction details for the service (at 1413). Accordingly, the payment gateway 1109 generates a unique transaction ID and sends the ID and the associated SMS short code to the NFC application 1103 (at 1415). The NFC application 1103 initiates payment for the service by initiating an SMS message containing the transaction ID addressed to the SMS short code corresponding to the operator billing system 1113 (at 1417). The SMS is forwarded to the operator billing system 1113 via the operator access point 1111 (at 1419).

After receiving the SMS message, the operator billing system 1113 forwards the message along with the MSISDN number corresponding to the consumer device 1101 to the payment gateway 1109 (at 1421). The payment gateway 1109 matches the transaction ID sent to the client at 1129 with the transaction ID received from the operator billing system 1113, and initiates a premium rate SMS (PSMS) message to the operator billing system 1113 (at 1423). The payment gateway 1109 also sends confirmation of the billing charge to the NFC application 1103 (at 1425) and confirmation to the store front 1107 to deliver any digital goods associated with the service (at 1427).

If applicable, the store front 1107 initiates download of any application or other digital content to the consumer device 1101. The store front 1107 also initiates subscription to any feature (e.g., data plan) require as part of the service (at 1429). The downloaded application 1145 is activated using the activation code read from the NFC tag 1105. The activation code may also be automatically passed to the NFC application 1103 by the store front 1107 or it may be manually entered by the consumer when prompted (at 1431).

Figure 15A:
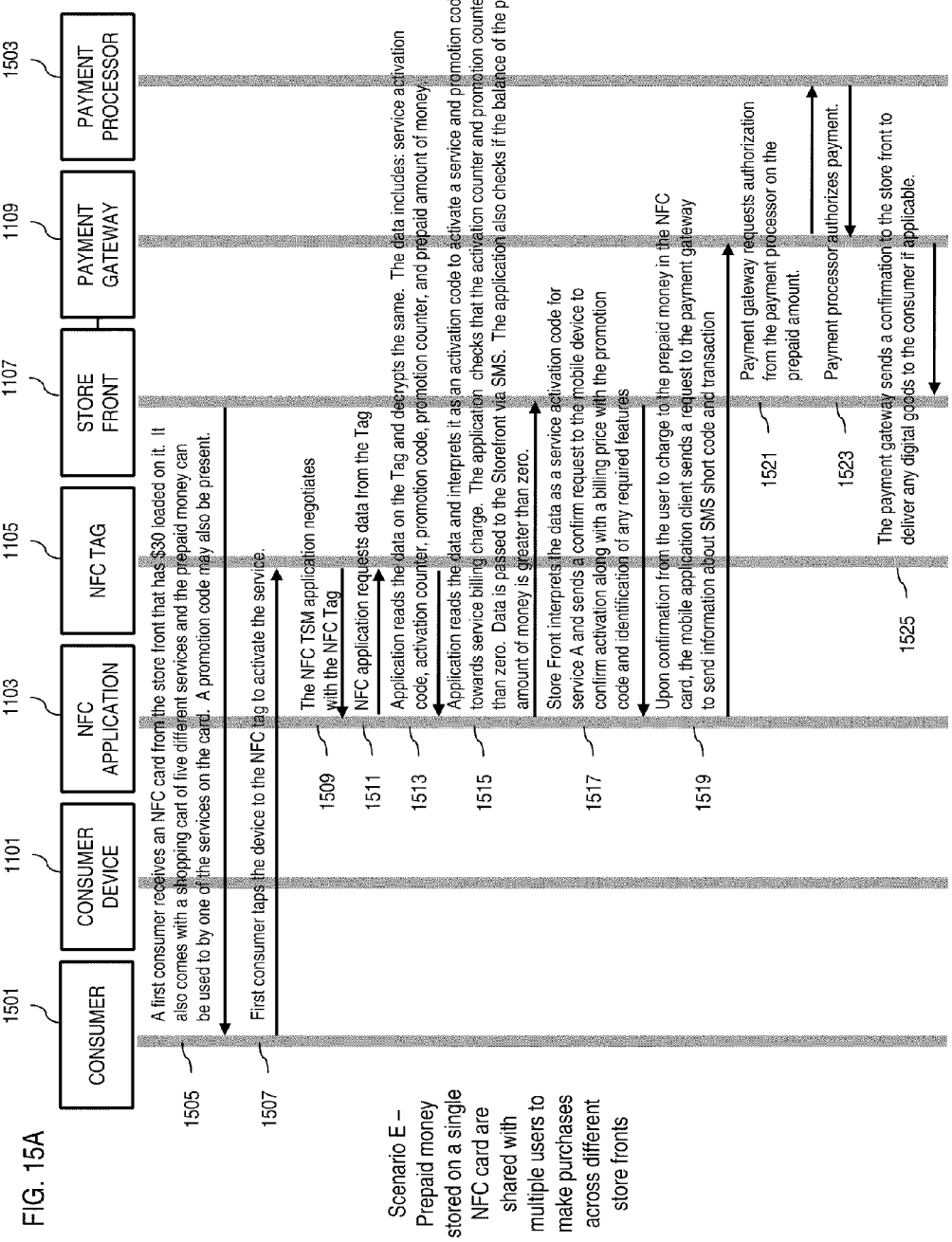
FIGS. 15A and 15B are time sequence diagrams that illustrate a sequence of messages and processes for managing a service using reusable prepaid bearer tags, according to various exemplary embodiments.
Figure 15B:
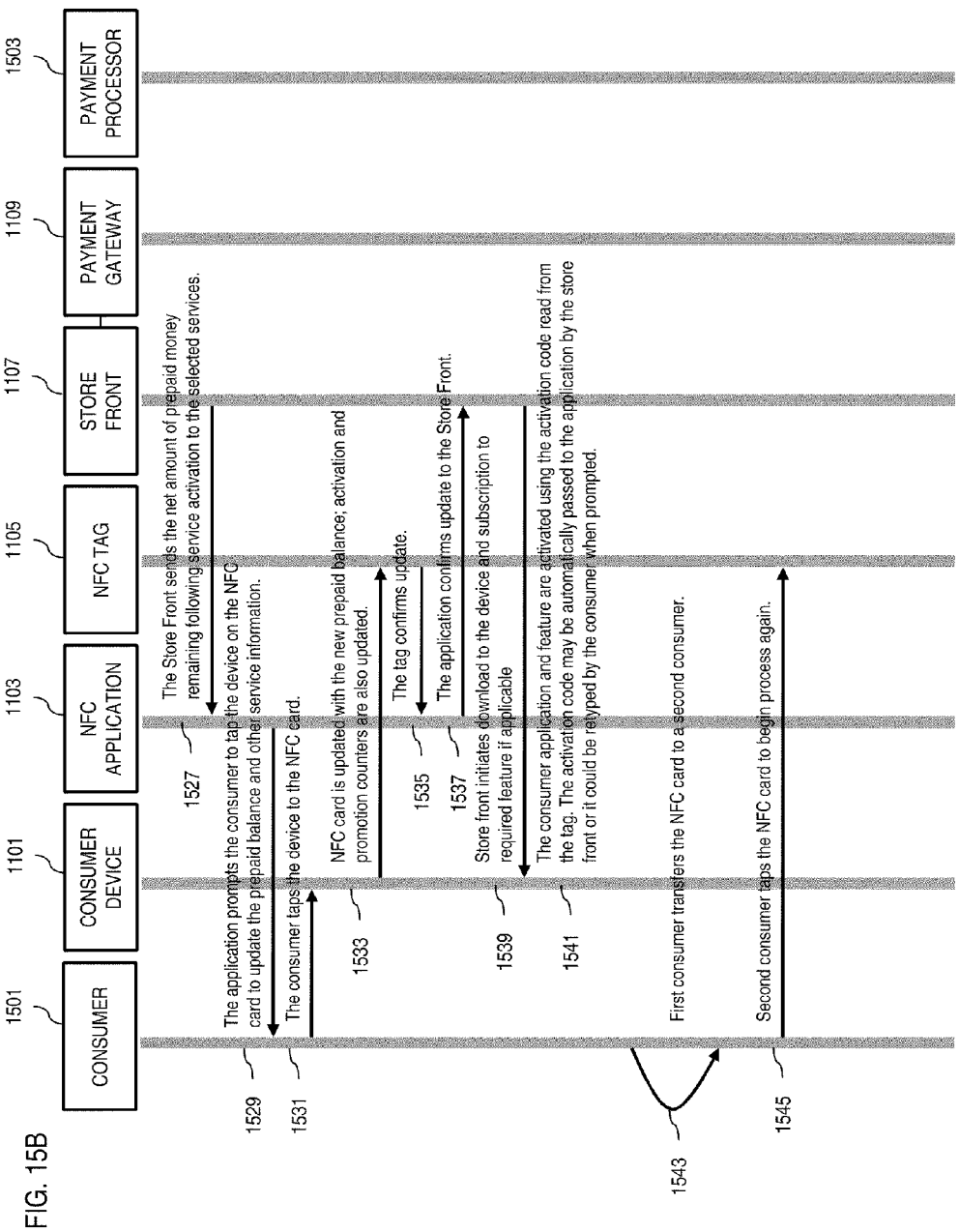

FIGS. 15A and 15B are time sequence diagrams that illustrate a sequence of messages and processes for managing a service using reusable prepaid bearer tags, according to various exemplary embodiments. FIGS. 15A and 15B include the additional processes of a consumer 1501 and a payment processor 1503. The consumer 1501 is any user of a prepaid bearer tag 105, and the payment processor 1503 is an entity for validating and authorizing payments using a prepaid bearer tag 105. In this example, the processes of FIGS. 15A and 15B represent a scenario in which a prepaid bearer tag 105 includes prepaid money stored on a single NFC card that is shared with multiple users to make purchases across different store fronts.

At 1505, a first consumer 1501 receives an NFC card (e.g., NFC tag 1105) from the store front 1107 that has a prepaid value of e.g. $30. The NFC card also comes with a shopping cart of five different services in which the prepaid value or currency can be used. In certain embodiments, a promotion code (e.g., offering discounts or specials) may also be present on the NFC card. The first consumer 1501 taps the consumer device 1101 to the NFC tag 1105 on NFC card corresponding to one or more selected services to activate (at 1507). In response, the NFC application 1103, e.g., via a trusted security manager (TSM) to maintain security of the service information) negotiates with the NFC tag 1105 at 1509, to request the service information from the NFC tag 1105 (at 1511). The NFC application 1103 then reads and decrypts the service information from the NFC tag 1105 (at 1513).

In this example, the data includes, for instance, a service activation code for each selected service, an activation counter to determine how many times each service has been activated, a promotion code for each service, a promotion counter to determine how many times each promotion has been used, and the prepaid value or balance remaining on the NFC card. At 1515, the NFC application 1103 reads the service information and interprets it as an activation code and a promotion code, and sends the service information to the store front 1107 via an SMS message.

On receipt of the message, the store front 1107 interprets the service information as a service activation code for a service and sends a confirmation request to the consumer device 1101 (at 1517). The confirmation message, for instance, contains the billing price for the service taking into account the promotion code. In addition, the confirmation message identifies any features that are required as part of the service. For example, an e-mail service requires subscription to a data plan. If the consumer device 1101 does not already have the feature (e.g., data plan) already configured, the store front 1107 includes the feature and associated billing information in the confirmation message.

Upon confirmation from the user to activate the service (and any additional features if applicable) and to apply the charges to the user's phone bill, the NFC application 1103 sends a request to the payment gateway 1109 to send information on the SMS short code and transaction details for the service (at 1519). On receipt of the confirmation, the payment gateway 1109 requests authorization from the payment processor 1503 to charge the cost of the selected services against the prepaid amount (at 1521). The payment processor 1503 then authorizes payment for the selected services from the prepaid amount (at 1523). The payment gateway 1109 then sends confirmation of the authorization to the store front 1107 to deliver any digital goods associated with the selected services (at 1525).

At 1527, the store front 1107 sends the net amount of prepaid money remaining following activation of the selected services to the NFC application 1103 for updating the service information in the NFC card. To initiate the update, the NFC application 1103 prompts the first consumer 1501 to tap the consumer device 1101 on the NFC card to update the prepaid balance and other service information (e.g., activation and promotion counters) (at 1529). In response, the consumer 1501 taps the device 1101 to the NFC card (at 1531), and the NFC card is updated with the new prepaid balance and service information accordingly (at 1533). The NFC tag 1105 confirms to the NFC application 1103 that the information has been updated (at 1537), and the NFC application 1103 relays the confirmation to the store front 1107.

If applicable, the store front 1107 initiates download of any application or other digital content to the consumer device 1101. The store front 1107 also initiates subscription to any feature (e.g., data plan) require as part of the service (at 1539). The downloaded application 1145 is activated using the activation code read from the NFC tag 1105. The activation code may also be automatically passed to the NFC application 1103 by the store front 1107 or it may be manually entered by the consumer when prompted (at 1541).

At this point, the activation of the selected services is complete on the device 1101 of the first consumer 1501. The first consumer 1501 then transfers the NFC card to a second consumer (at 1543). The second consumer can then use taps the NFC card to begin the process of using the prepaid card as described above with respect to the first consumer 1501 (at 1545).

With the above processes, the reusable capability of the bearer tag permits greater adoption of this technology by reducing cost of these tags or cards. Moreover, a user can readily give the tag to a friend or colleague, thereby encourage the use of the tag and associated services.

Figure 16:
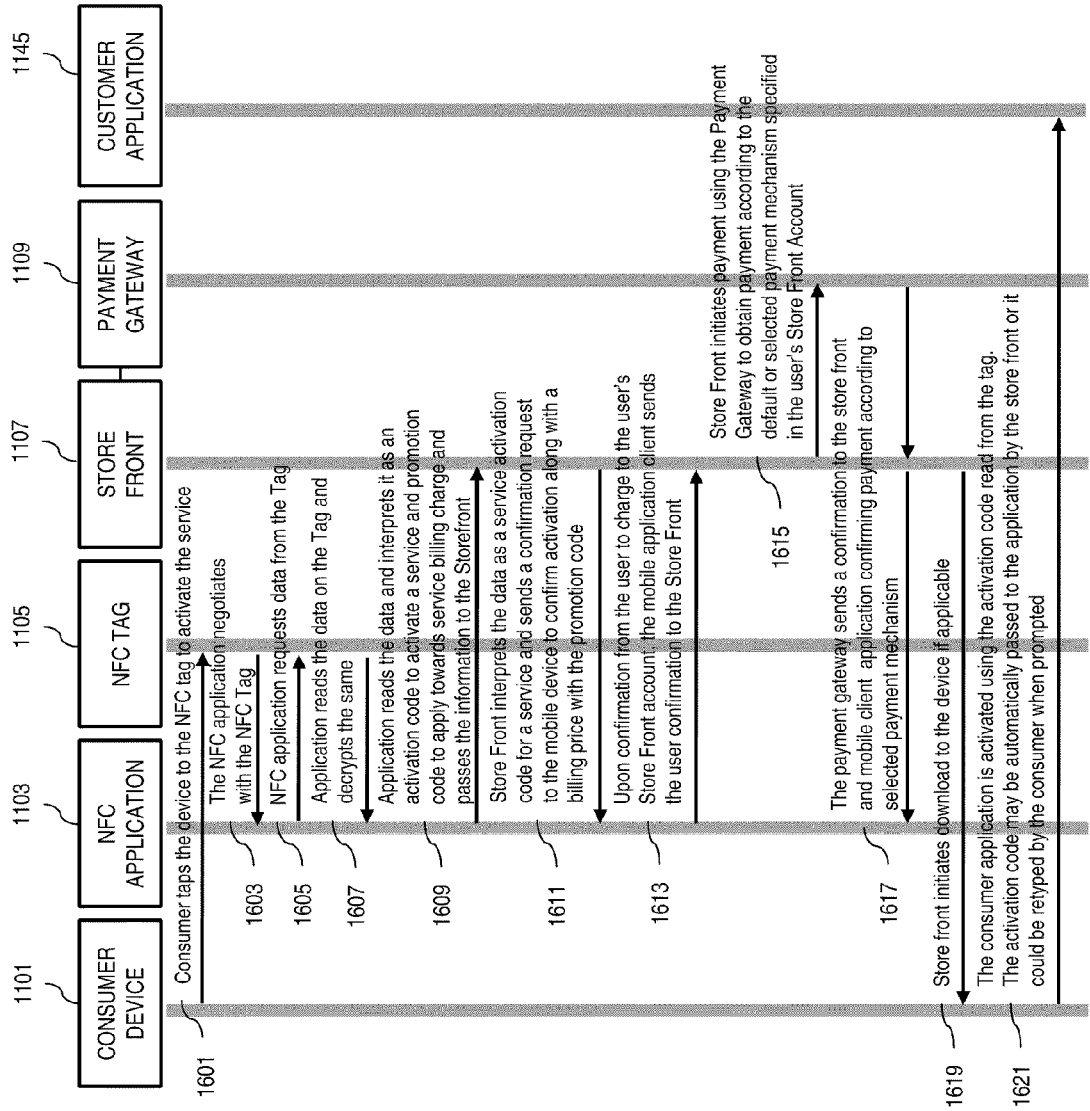
FIG. 16 is a time sequence diagram that illustrates a sequence of messages and processes for managing a service using a store front account, according to an exemplary embodiment.

FIG. 16 is time sequence diagram that illustrates a sequence of messages, processes, a method, and a system for managing a service using a services platform 107 account, such as a store front 1107 account, according to an exemplary embodiment. In this example, the process of FIG. 16 represents a scenario in which an application or service corresponding to a bearer tag 105 is purchased using an account registered with the services platform 107, such as the store front 1107, by a user. For example, the store front 1107 is an online merchant offering services, applications, goods, and/or other items for sale (e.g., the Nokia Ovi Store). In addition, the NFC application 1103 is an example of an NFC-enabled store client resident on the consumer device 1101 that is used to manage access to the store front 1107. Moreover, although the payment gateway 1109 is shown in FIG. 16 as a separate process, it is contemplated that payment gateway 1109 may also be a component within the store front 1107 and/or in the services platform 107.

At 1601, the consumer device 1101 is tapped on the NFC tag 1105 to activate a service. The service, for instance an application, is offered for sale and/or download by the store front 1107. In response, the NFC application 1103 (e.g., a store client resident on the consumer device 1101) negotiates with the NFC tag 1105 (at 1603) to request the service information corresponding to the service, such as an application, from the NFC tag 1105 (1605). The NFC application 1103 then reads and decrypts the service information from the NFC tag 1105 (at 1607).

The service information includes, for instance, address to a service, an activation code for a service, and/or a promotion code to apply towards the service download and/or billing charge. In one embodiment, the NFC application 1103 can determine whether the service is available by consulting a database of services stored locally in the consumer device 1101 and accessible by the NFC application 1103. If some or all of the information regarding the service is not available locally, the NFC application 1103 requests the information from the store front 1107. It is contemplated that the local database of services available from the store front 1107 can be updated periodically or when the NFC application 1103 receives a request for a service that is not in the local database. At 1609, the NFC application 1103 interprets the reading of the service information as a request to purchase and/or download the service, such as the application, corresponding to the service activation code and sends the activation request to the store front 1107 for processing and billing against an billing account registered with the store front 1107 that corresponds to the user of the consumer device 1101. In exemplary embodiments, the NFC application may use any communication mechanism (e.g., SMS message, web interface, WAP interface, etc.) to send the request to the store front 1107. Alternatively, the NFC application 1103 can determine whether some or all of the service information regarding the service is available on the consumer device 1101 by consulting a database of services stored locally in the consumer device 1101 and accessible by the NFC application 1103. If some or all of the information regarding the service is not available locally, the NFC application 1103 requests the information from the store front 1107. It is contemplated that the local database of the service information of the services available from the store front 1107 can be updated periodically or when the NFC application 1103 receives a request for a service which information is not in the local database.

Alternatively, the NFC application 1103 can determine whether the application regarding the service is available on the consumer device 1101 by consulting a database of services stored locally in the consumer device 1101 and accessible by the NFC application 1103. If some or all parts of the application regarding the service are not available locally, the NFC application 1103 requests some or all parts of application from the store front 1107. It is contemplated that the local database of the applications available from the store front 1107 can be updated periodically or when the NFC application 1103 receives a request for a service which information is not in the local database. By way of example, the user is asked to create a billing account with the services platform 107, such as the store front 1107, either when the user first accesses the store front 1107 or when the user makes a first purchase from the store front 1107. It is also contemplated that the user may register for a new account or update a previously created account at any time. During the account registration and creation process, the user, for instance, provides contact information and specifies billing preferences, e.g., default form of payment such as credit card payment, direct bank payment or operator billing. The contact information and billing preferences may then be used for subsequent purchases from the store front 1107.

On receipt of the request for the service or application from the NFC application 1103, the store front 1107 interprets the service information as a service activation code for the requested application and sends a confirmation request to the NFC application 1103 (at 1611). The confirmation message, for instance, contains the billing price for the service taking into account the promotion code.

The NFC application 1103 presents the confirmation message to the user for confirmation. On viewing the confirmation, the user may specify that the service should be paid for using one of the available payment mechanisms, such as a default payment mechanism, e.g., a credit card, that is specified in the user's store front 1107 account. As part of the confirmation process, the user may also change the default payment option temporarily or permanently before the store front 1107 processes the current request. Upon confirmation from the user to activate the service, e.g., purchase and/download of the application, and to apply the charges for the service against the user's store front 1107 account, the NFC application 1103 sends the confirmation to the store front 1107 for processing (at 1613).

The store front 1107 then initiates payment for the requested service using the payment gateway 1109 (at 1615). As discussed previously, the payment gateway 1109 may be incorporated in the store front 1107 or may be a standalone component. The payment gateway 1109 may also be incorporated in any other component within the system 100. In exemplary embodiments, the payment gateway 1109 receives the amount to be charged against the account from the store front 1107 and obtains payment using the specified mechanism (e.g., credit card). This payment mechanism is either the default payment mechanism or another payment mechanism selected by the user during the service confirmation process. After receiving the payment via the selected payment mechanism, the payment gateway 1109 sends a confirmation of the payment to the store front 1107 and the NFC application 1103 (e.g., store client).

In one embodiment, the NFC application 1103 determines whether the purchased application 1145 is already resident on the device (e.g., already installed, preloaded onto the device, or otherwise available locally to the NFC application 1103). If the application 1145 is not already installed and not available locally on the consumer device 1101, the store front 1107 initiates download of the application 1145 to the device. The download may occur immediately or at a later time. In addition or alternatively, the application 1145 may be made available for download in a download section of the user's store front 1107 account. In this way, the user may download the purchased application 1145 at the user's convenience. After the application 1145 is installed, the application 1145 is activated using the activation code read from the NFC tag 1105. The activation code may also be automatically passed to the NFC application 1103 by the store front 1107 or it may be manually entered by the user when prompted (at 1621).

In an example embodiment of the invention, processes, a method, and a system for managing a service purchase, downloading, and billing using a services platform 107 account, such as a store front 1107 account, comprising: detecting an input from a bearer tag 105, such as the NFC tag 1105, through a sensor, such as the tag reader 205, of the consumer device 1101 (e.g., the UE 101), wherein the input identifies a purchasable and/or downloadable service; further receiving the identified service by a store client, such as the NFC application 1103, of the consumer device 1101; further analyzing whether the identified service is available in the store client of the consumer device 1101; further providing the identified service for purchasing from the store client of the consumer device 1101 if available; and utilizing one or more mechanisms for payment available in the store client of the consumer device 1101. Further, the processes, method, and system may comprise the consumer device 1101 using a default payment mechanism. Further, the processes, method and system may comprise the consumer device 1101 receiving information on the available payment mechanisms from a memory of the store client, or from the service provider, such as the services platform 107 or the store front 1107. Further, the processes, method, and system may comprise contacting the service provider, such as the services platform 107 or the store front 1107, in the communication network 103 to search for the service, if the service is not in consumer device 1101. Further, the processes, method and system may comprise that the consumer device 1101 identifies through the service provider, such as the service platform 107 or the store front 1107, the cheapest price of the identified service.

Figure 17:
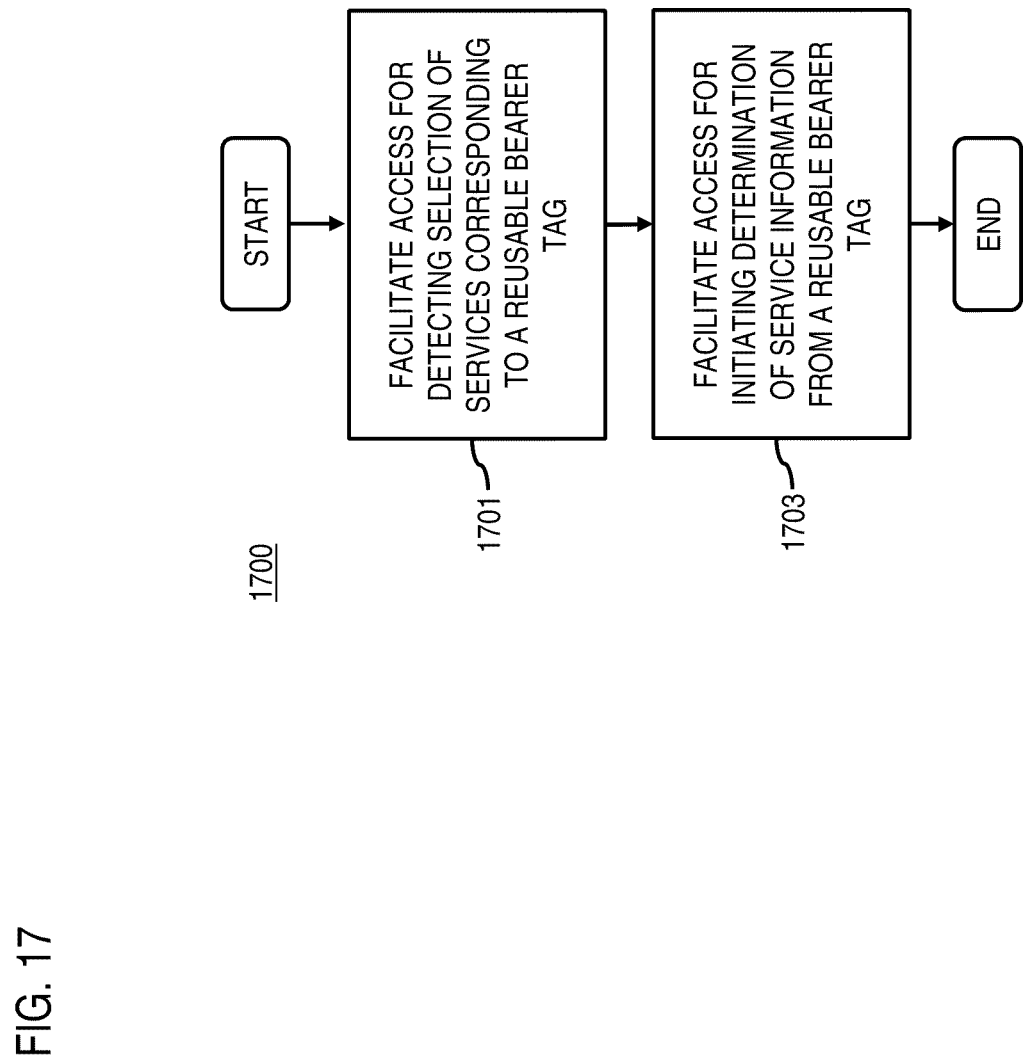
FIG. 17 is a flowchart for providing access for managing services using reusable bearer tags, according to an exemplary embodiment.

FIG. 17 is a flowchart for providing access for managing services using reusable bearer tags, according to an exemplary embodiment. In one embodiment, the services platform 107 performs the process 1700 of FIG. 17. In step 1701, the services platform 107 facilitates access to a service over, for instance, the communication network 103, wherein the service supports detecting user input from a user for selecting one or more services corresponding to a bearer tag 105 that is reusable by another user. As described previously, the bearer tag 105 specifies a prepaid amount of currency for engaging one or more of the services corresponding to the bearer tag 105. By way of example, facilitating access includes granting access rights to allow access to the communication network 103 or to an interface to the communication network 103. More specifically, providing access includes providing or arranging for sufficient network resources (e.g., bandwidth, access points, etc.) to facilitate use of the service over the communication network 103. In this embodiment, the communication network 103 provides access between the services platform 107, the network billing system 109, and the UE 101 to support the services corresponding to the bearer tag 105. In step 1703, the services platform 107 facilitates further access to the service to initiate determination of the service information from the bearer tag 105, generate a request to active one or more services corresponding to the bearer tag 105, transmit the request to the services platform 107 for activating one or more services and to the network billing system 109 for billing, and to update the service information in the bearer tag 105 accordingly.

The processes described herein for managing services using a reusable prepaid bearer tag 105 may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 18:
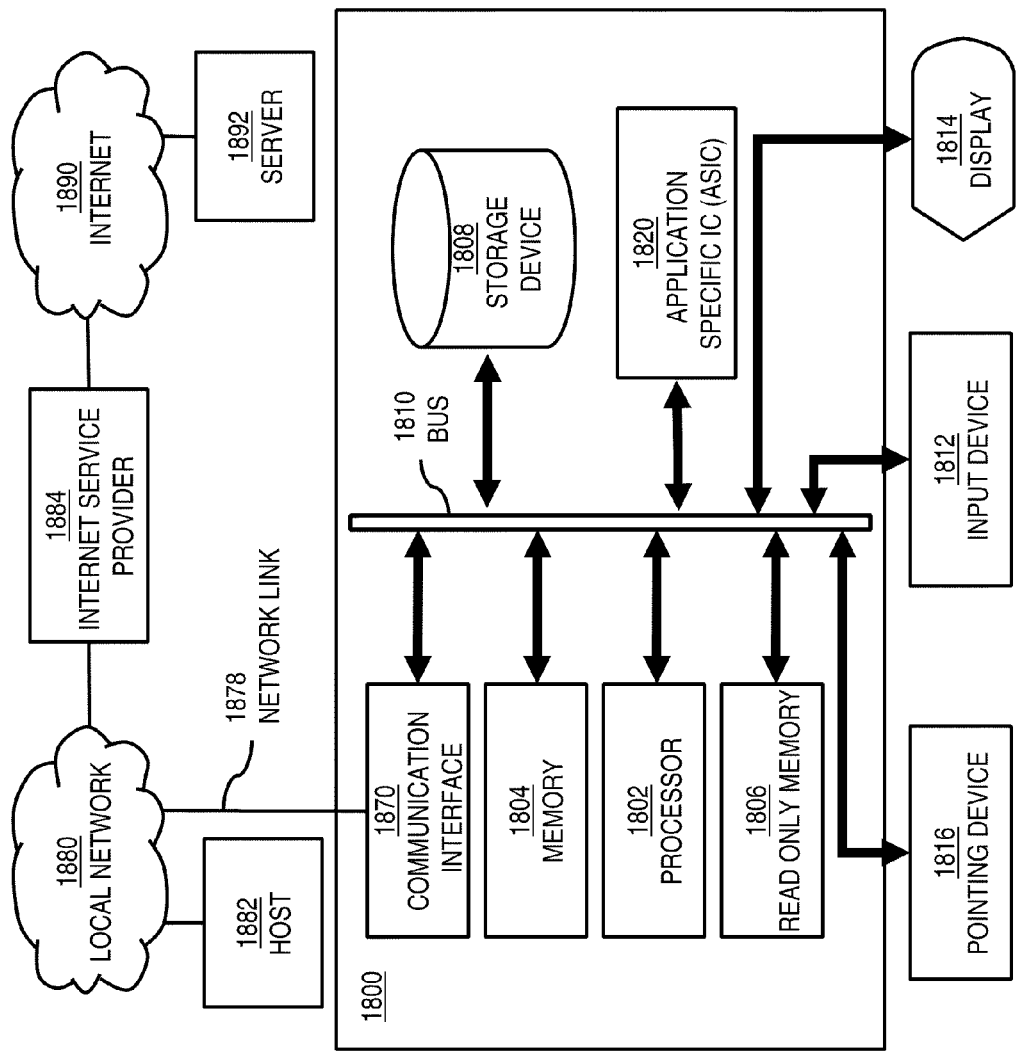
FIG. 18 is a diagram of hardware that can be used to implement an embodiment of the invention.

FIG. 18 illustrates a computer system 1800 upon which an embodiment of the invention may be implemented. Computer system 1800 is programmed (e.g., via computer program code or instructions) to manage services using reusable prepaid bearer tags as described herein and includes a communication mechanism such as a bus 1810 for passing information between other internal and external components of the computer system 1800. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1810 includes one or more parallel conductors of information so that information is transferred quickly among devices coupled to the bus 1810. One or more processors 1802 for processing information are coupled with the bus 1810.

A processor 1802 performs a set of operations on information as specified by computer program code related to managing services using reusable prepaid bearer tags. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1810 and placing information on the bus 1810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1800 also includes a memory 1804 coupled to bus 1810. The memory 1804, such as a random access memory (RAM) or other dynamic storage device, stores information including processor instructions for managing services using reusable prepaid bearer tags. Dynamic memory allows information stored therein to be changed by the computer system 1800. RAM allows a unit of information stored at a location called a memory address to be stored and retrieved independently of information at neighboring addresses. The memory 1804 is also used by the processor 1802 to store temporary values during execution of processor instructions. The computer system 1800 also includes a read only memory (ROM) 1806 or other static storage device coupled to the bus 1810 for storing static information, including instructions, that is not changed by the computer system 1800. Some memory is composed of volatile storage that loses the information stored thereon when power is lost. Also coupled to bus 1810 is a non-volatile (persistent) storage device 1808, such as a magnetic disk, optical disk or flash card, for storing information, including instructions, that persists even when the computer system 1800 is turned off or otherwise loses power.

Information, including instructions for managing services using reusable prepaid bearer tags, is provided to the bus 1810 for use by the processor from an external input device 1812, such as a keyboard containing alphanumeric keys operated by a human user, or a sensor. A sensor detects conditions in its vicinity and transforms those detections into physical expression compatible with the measurable phenomenon used to represent information in computer system 1800. Other external devices coupled to bus 1810, used primarily for interacting with humans, include a display device 1814, such as a cathode ray tube (CRT) or a liquid crystal display (LCD), or plasma screen or printer for presenting text or images, and a pointing device 1816, such as a mouse or a trackball or cursor direction keys, or motion sensor, for controlling a position of a small cursor image presented on the display 1814 and issuing commands associated with graphical elements presented on the display 1814. In some embodiments, for example, in embodiments in which the computer system 1800 performs all functions automatically without human input, one or more of external input device 1812, display device 1814 and pointing device 1816 is omitted.

In the illustrated embodiment, special purpose hardware, such as an application specific integrated circuit (ASIC) 1820, is coupled to bus 1810. The special purpose hardware is configured to perform operations not performed by processor 1802 quickly enough for special purposes. Examples of application specific ICs include graphics accelerator cards for generating images for display 1814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1800 also includes one or more instances of a communications interface 1870 coupled to bus 1810. Communication interface 1870 provides a one-way or two-way communication coupling to a variety of external devices that operate with their own processors, such as printers, scanners and external disks. In general the coupling is with a network link 1878 that is connected to a local network 1880 to which a variety of external devices with their own processors are connected. For example, communication interface 1870 may be a parallel port or a serial port or a universal serial bus (USB) port on a personal computer. In some embodiments, communications interface 1870 is an integrated services digital network (ISDN) card or a digital subscriber line (DSL) card or a telephone modem that provides an information communication connection to a corresponding type of telephone line. In some embodiments, a communication interface 1870 is a cable modem that converts signals on bus 1810 into signals for a communication connection over a coaxial cable or into optical signals for a communication connection over a fiber optic cable. As another example, communications interface 1870 may be a local area network (LAN) card to provide a data communication connection to a compatible LAN, such as Ethernet. Wireless links may also be implemented. For wireless links, the communications interface 1870 sends or receives or both sends and receives electrical, acoustic or electromagnetic signals, including infrared and optical signals, that carry information streams, such as digital data. For example, in wireless handheld devices, such as mobile telephones like cell phones, the communications interface 1870 includes a radio band electromagnetic transmitter and receiver called a radio transceiver. In certain embodiments, the communications interface 1870 enables connection to the communication network 103 for managing services using reusable prepaid bearer tags on the UE 101.

The term computer-readable medium is used herein to refer to any medium that participates in providing information to processor 1802, including instructions for execution. Such a medium may take many forms, including, but not limited to, non-volatile media, volatile media and transmission media. Non-volatile media include, for example, optical or magnetic disks, such as storage device 1808. Volatile media include, for example, dynamic memory 1804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Figure 19:
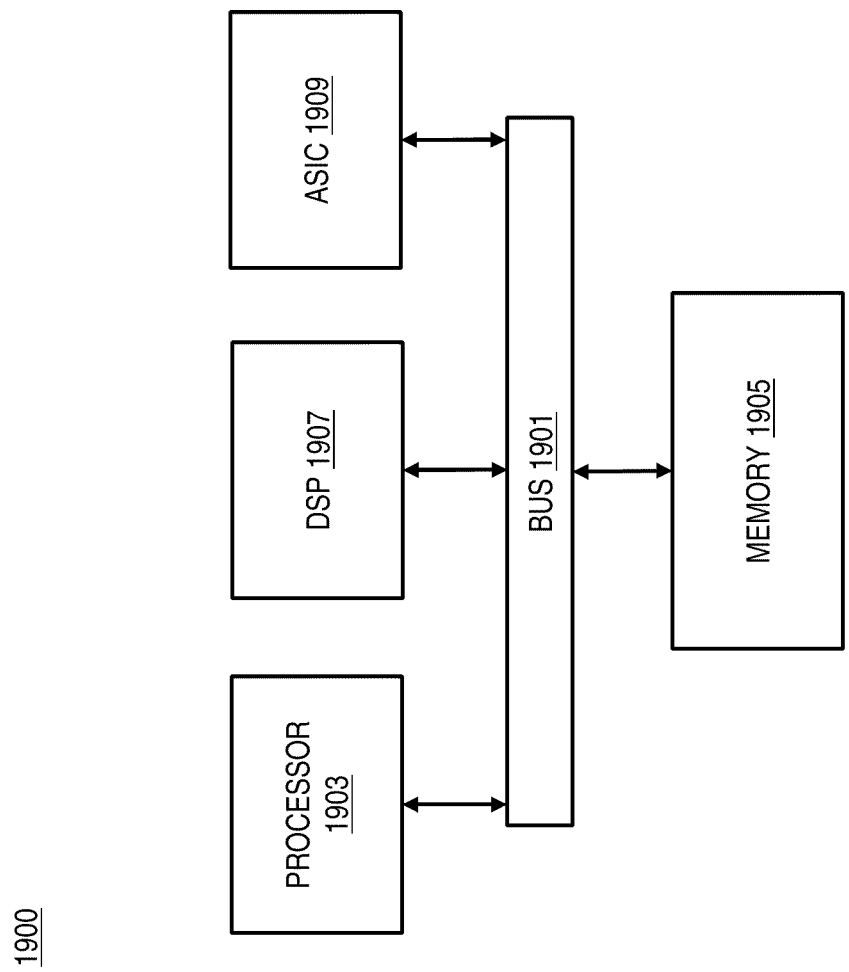
FIG. 19 is a diagram of a chip set that can be used to implement an embodiment of the invention.

FIG. 19 illustrates a chip set 1900 upon which an embodiment of the invention may be implemented. Chip set 1900 is programmed to manage services using reusable prepaid bearer tags as described herein and includes, for instance, the processor and memory components described with respect to FIG. 18 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1900 includes a communication mechanism such as a bus 1901 for passing information among the components of the chip set 1900. A processor 1903 has connectivity to the bus 1901 to execute instructions and process information stored in, for example, a memory 1905. The processor 1903 may include one or more processing cores with each core configured to perform independently. A multi-core processor enables multiprocessing within a single physical package. Examples of a multi-core processor include two, four, eight, or greater numbers of processing cores. Alternatively or in addition, the processor 1903 may include one or more microprocessors configured in tandem via the bus 1901 to enable independent execution of instructions, pipelining, and multithreading. The processor 1903 may also be accompanied with one or more specialized components to perform certain processing functions and tasks such as one or more digital signal processors (DSP) 1907, or one or more application-specific integrated circuits (ASIC) 1909. A DSP 1907 typically is configured to process real-world signals (e.g., sound) in real time independently of the processor 1903. Similarly, an ASIC 1909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1903 and accompanying components have connectivity to the memory 1905 via the bus 1901. The memory 1905 includes both dynamic memory (e.g., RAM, magnetic disk, writable optical disk, etc.) and static memory (e.g., ROM, CD-ROM, etc.) for storing executable instructions that when executed perform the inventive steps described herein to manage services using reusable prepaid bearer tags. The memory 1905 also stores the data associated with or generated by the execution of the inventive steps.

Figure 20:
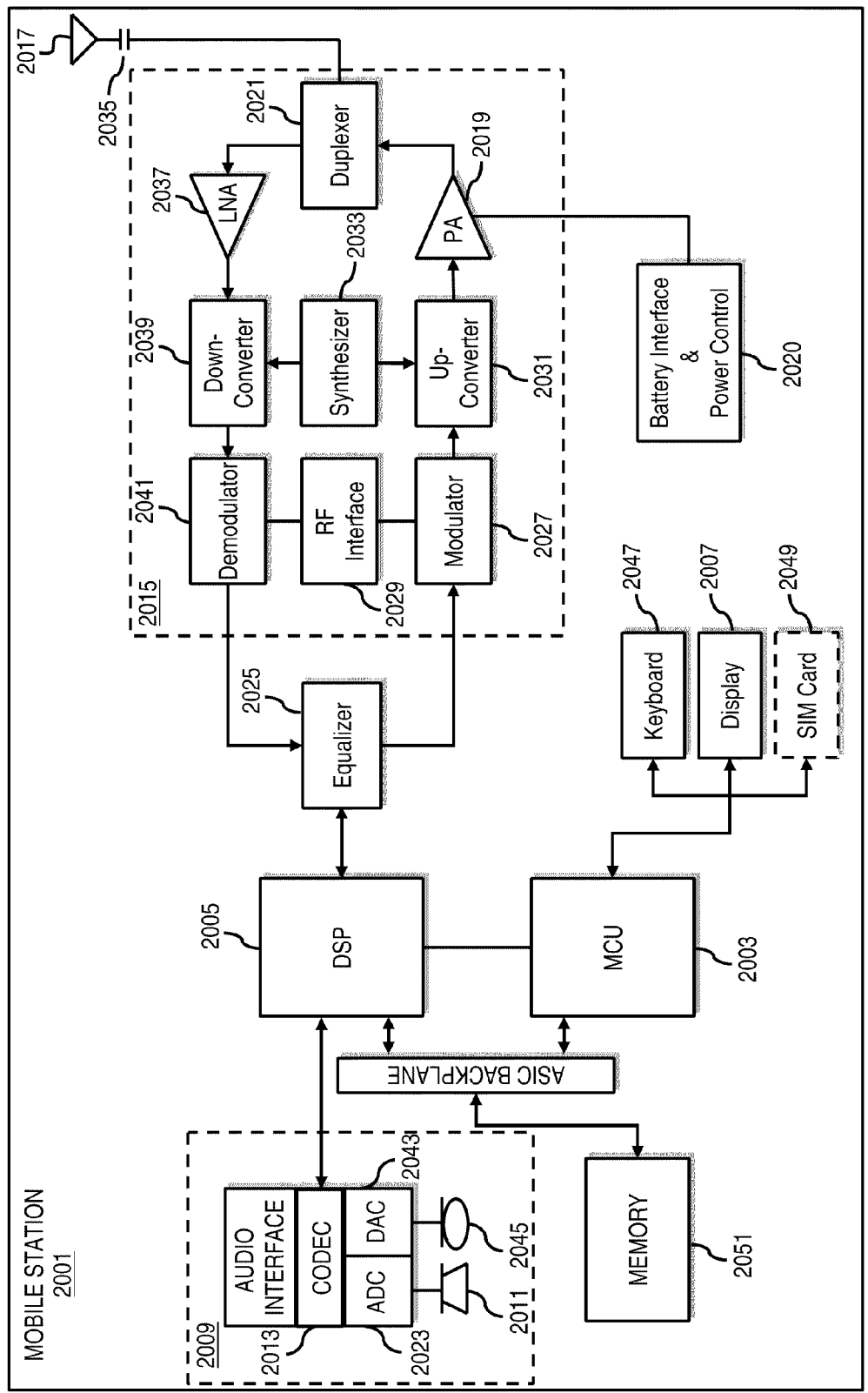
FIG. 20 is a diagram of a mobile station (e.g., handset) that can be used to implement an embodiment of the invention.

FIG. 20 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 2003, a Digital Signal Processor (DSP) 2005, and a receiver/transmitter unit including a microphone gain control unit and a speaker gain control unit. A main display unit 2007 provides a display to the user in support of various applications and mobile station functions that offer automatic contact matching. An audio function circuitry 2009 includes a microphone 2011 and microphone amplifier that amplifies the speech signal output from the microphone 2011. The amplified speech signal output from the microphone 2011 is fed to a coder/decoder (CODEC) 2013.

A radio section 2015 amplifies power and converts frequency in order to communicate with a base station, which is included in a mobile communication system, via antenna 2017. The power amplifier (PA) 2019 and the transmitter/modulation circuitry are operationally responsive to the MCU 2003, with an output from the PA 2019 coupled to the duplexer 2021 or circulator or antenna switch, as known in the art. The PA 2019 also couples to a battery interface and power control unit 2020.

In use, a user of mobile station 2001 speaks into the microphone 2011 and his or her voice along with any detected background noise is converted into an analog voltage. The analog voltage is then converted into a digital signal through the Analog to Digital Converter (ADC) 2023. The control unit 2003 routes the digital signal into the DSP 2005 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 2025 for compensation of any frequency-dependent impairments that occur during transmission though the air such as phase and amplitude distortion. After equalizing the bit stream, the modulator 2027 combines the signal with a RF signal generated in the RF interface 2029. The modulator 2027 generates a sine wave by way of frequency or phase modulation. In order to prepare the signal for transmission, an up-converter 2031 combines the sine wave output from the modulator 2027 with another sine wave generated by a synthesizer 2033 to achieve the desired frequency of transmission. The signal is then sent through a PA 2019 to increase the signal to an appropriate power level. In practical systems, the PA 2019 acts as a variable gain amplifier whose gain is controlled by the DSP 2005 from information received from a network base station. The signal is then filtered within the duplexer 2021 and optionally sent to an antenna coupler 2035 to match impedances to provide maximum power transfer. Finally, the signal is transmitted via antenna 2017 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 2001 are received via antenna 2017 and immediately amplified by a low noise amplifier (LNA) 2037. A down-converter 2039 lowers the carrier frequency while the demodulator 2041 strips away the RF leaving only a digital bit stream. The signal then goes through the equalizer 2025 and is processed by the DSP 2005. A Digital to Analog Converter (DAC) 2043 converts the signal and the resulting output is transmitted to the user through the speaker 2045, all under control of a Main Control Unit (MCU) 2003—which can be implemented as a Central Processing Unit (CPU) (not shown).

The MCU 2003 receives various signals including input signals from the keyboard 2047. The keyboard 2047 and/or the MCU 2003 in combination with other user input components (e.g., the microphone 2011) comprise a user interface circuitry for managing user input. The MCU 2003 runs a user interface software to facilitate user control of at least some functions of the mobile station 2001 to manage services using reusable prepaid bearer tags. The MCU 2003 also delivers a display command and a switch command to the display 2007 and to the speech output switching controller, respectively. Further, the MCU 2003 exchanges information with the DSP 2005 and can access an optionally incorporated SIM card 2049 and a memory 2051. In addition, the MCU 2003 executes various control functions required of the station. The DSP 2005 may, depending upon the implementation, perform any of a variety of conventional digital processing functions on the voice signals. Additionally, DSP 2005 determines the background noise level of the local environment from the signals detected by microphone 2011 and sets the gain of microphone 2011 to a level selected to compensate for the natural tendency of the user of the mobile station 2001.

The CODEC 2013 includes the ADC 2023 and DAC 2043. The memory 2051 stores various data including call incoming tone data and is capable of storing other data including music data received via, e.g., the global Internet. The software module could reside in RAM memory, flash memory, registers, or any other form of writable storage medium known in the art. The memory device 2051 may be, but not limited to, a single memory, CD, DVD, ROM, RAM, EEPROM, optical storage, or any other non-volatile storage medium capable of storing digital data.

An optionally incorporated SIM card 2049 carries, for instance, important information, such as the cellular phone number, the carrier supplying service, subscription details, and security information. The SIM card 2049 serves primarily to identify the mobile station 2001 on a radio network. The card 2049 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining to detect input from a user for selecting one or more services corresponding to a bearer tag, wherein the bearer tag is reusable by one or more other users while being used by the user, and the user input is indicated by interaction between the bearer tag and a user equipment on or near the bearer tag,
   wherein the bearer tag specifies a first amount of prepaid currency for engaging one or more of the services by the user and specifies a second amount of prepaid currency for the one or more other users,
   wherein the first amount of prepaid currency and the second amount of prepaid currency are independent to the user and the one or more other users respectively, and
   wherein the bearer tag has a predetermined limitation on a total number uses of the bearer tag or is valid only for a defined period of time, and the bearer tag also includes one or more of a device type limitation in which the bearer tag is valid only when accessed by a certain user equipment type, and a user account type limitation in which the bearer tag is valid only when accessed by a certain type of user account.

2. A method of claim 1, wherein the bearer tag comprises a near field communication (NFC) tag, radio frequency identification (RFID) tag, contactless card, or a combination thereof corresponding to each of the services, and wherein the interaction includes tapping the user equipment one or more times on or near the bearer tag, by activating one or more buttons or menu options of the user equipment, by using the user equipment to read the bearer tag, or by a combination thereof.

3. A method of claim 1, further comprising:
   initiating determination of service information from the bearer tag in response to the input, the service information comprising at least in part a service code corresponding to each of the one or more selected services, the first amount of prepaid currency, predetermined limitations on the activation of the one or more selected services or on the use of the first amount of prepaid currency, or any combination thereof;

generating a request to activate the one or more selected services according to the service information;
determining to initiate transmission of the request to a services platform for activating the one or more selected services and billing against the first amount of prepaid currency; and
determining to initiate update of the service information based on the activation of the one or more selected services.

4. A method of claim 3, wherein the predetermined limitations comprise a temporal limitation for using the bearer tag, a location limitation for using the bearer tag, or a combination thereof.

5. A method of claim 1, further comprising:
determining to detect another input from the user for selecting a currency conversion; and
converting the first amount of prepaid currency or the second amount of prepaid currency based on the selected currency conversion,
wherein the first amount of prepaid currency and the second amount of prepaid currency are either monetary currency or currency specific to the one or more services.

6. A method of claim 1, further comprising:
facilitating access to the one or more selected services comprising,
initiating determination of service information from the bearer tag in response to the input, the service information comprising at least in part a service code corresponding to each of the one or more selected services, the first amount of prepaid currency, predetermined limitations on the activation of the one or more selected services or on the use of the first amount of prepaid currency, or any combination thereof;
generating a request to activate the one or more selected services according to the service information;
determining to initiate transmission of the request to a services platform for activating the one or more selected services and billing against the first amount of prepaid currency; and
determining to initiate update of the service information based on the activation of the one or more selected services.

7. An apparatus comprising:
at least one processor; and
at least one memory including computer program code,
the at least one memory and the computer program code configured to, with the at least one processor, cause the apparatus to perform at least the following,
determine to detect input from a user for selecting one or more services corresponding to a bearer tag, wherein the bearer tag is reusable by one or more other users while being used by the user, and the user input is indicated by interaction between the bearer tag and a user equipment on or near the bearer tag,
wherein the bearer tag specifies a first amount of prepaid currency for engaging one or more of the services by the user and specifies a second amount of prepaid currency for the one or more other users,
wherein the first amount of prepaid currency and the second amount of prepaid currency are independent to the user and the one or more other users respectively, and
wherein the bearer tag has a predetermined limitation on a total number uses of the bearer tag or is valid only for a defined period of time, and the bearer tag also includes one or more of a device type limitation in which the bearer tag is valid only when accessed by a certain user equipment type, and a user account type limitation in which the bearer tag is valid only when accessed by a certain type of user account.

8. An apparatus of claim 7, wherein the bearer tag comprises a near field communication (NFC) tag, radio frequency identification (RFID) tag, contactless card, or a combination thereof corresponding to each of the services, and wherein the interaction includes tapping the user equipment one or more times on or near the bearer tag, by activating one or more buttons or menu options of the user equipment, by using the user equipment to read the bearer tag, or by a combination thereof.

9. An apparatus of claim 7, wherein the apparatus is further caused to:
initiate determination of service information from the bearer tag in response to the input, the service information comprising at least in part a service code corresponding to each of the one or more selected services, the first amount of prepaid currency, predetermined limitations on the activation of the one or more selected services or on the use of the first amount of prepaid currency, or any combination thereof;
generate a request to activate the one or more selected services according to the service information;
determine to initiate transmission of the request to a services platform for activating the one or more selected services and billing against the first amount of prepaid currency; and
determine to initiate update of the service information based on the activation of the one or more selected services.

10. An apparatus of claim 9, wherein the predetermined limitations comprise a temporal limitation for using the bearer tag, a location limitation for using the bearer tag, or a combination thereof.

11. An apparatus of claim 7, wherein the apparatus is further caused to:
determine to detect another input from the user for selecting a currency conversion; and
convert the first amount of prepaid currency or the second amount of prepaid currency based on the selected currency conversion,
wherein the first amount of prepaid currency and the second amount of prepaid currency are either monetary currency or currency specific to the one or more services.

12. An apparatus of claim 7, wherein the apparatus is a mobile phone further comprising:
user interface circuitry and user interface software configured to facilitate user control of at least some functions of the mobile phone through use of a display and configured to respond to user input; and
a display and display circuitry configured to display at least a portion of a user interface of the mobile phone, the display and display circuitry configured to facilitate user control of at least some functions of the mobile phone.

13. A non-transitory computer readable storage medium carrying one or more sequences of one or more instructions which, when executed by one or more processors, cause an apparatus to at least perform the following steps:
determining to detect input from a user for selecting one or more services corresponding to a bearer tag, wherein the bearer tag is reusable by one or more other users while being used by the user, and the user input is indicated by interaction between the bearer tag and a user equipment on or near the bearer tag,
wherein the bearer tag specifies a first amount of prepaid currency for engaging one or more of the services by the user and specifies a second amount of prepaid currency for the one or more other users, wherein the first amount of prepaid currency and the second amount of prepaid currency are independent to the user and the one or more other users respectively, and wherein the bearer tag has a predetermined limitation on a total number uses of the bearer tag or is valid only for a defined period of time, and the bearer tag also includes one or more of a device type limitation in which the bearer tag is valid only when accessed by a certain user equipment type, and a user account type limitation in which the bearer tag is valid only when accessed by a certain type of user account.

14. A non-transitory computer readable storage medium of claim 13, wherein the bearer tag comprises a near field communication (NFC) tag, radio frequency identification (RFID) tag, contactless card, or a combination thereof corresponding to each of the services, and wherein the interaction includes tapping the user equipment one or more times on or near the bearer tag, by activating one or more buttons or menu options of the user equipment, by using the user equipment to read the bearer tag, or by a combination thereof.

15. A non-transitory computer readable storage medium of claim 13, wherein the apparatus is caused to further perform:
   initiating determination of service information from the bearer tag in response to the input, the service information comprising at least in part a service code corresponding to each of the one or more selected services, the first amount of prepaid currency, predetermined limitations on the activation of the one or more selected services or on the use of the first amount of prepaid currency, or any combination thereof;
   determining to generate a request to activate the one or more selected services according to the service information;
   determining to initiate transmission of the request to a services platform for activating the one or more selected services and billing against the first amount of prepaid currency; and
   determining to initiate update of the service information based on the activation of the one or more selected services.

16. A non-transitory computer readable storage medium of claim 13, wherein the predetermined limitations comprise a temporal limitation for using the bearer tag, a location limitation for using the bearer tag, or a combination thereof.

17. A method comprising:
   facilitating access, including granting access rights to allow access, to an interface to allow access to a service via a network, the service determining to detect input from a user for selecting one or more services corresponding to a bearer tag, wherein the bearer tag is reusable by one or more other users while being used by the user, and the user input is indicated by interaction between the bearer tag and a user equipment on or near the bearer tag,
   wherein the bearer tag specifies a first amount of prepaid currency for engaging one or more of the services by the user and specifies a second amount of prepaid currency for the one or more other users,
   wherein the first amount of prepaid currency and the second amount of prepaid currency are from a common pool of prepaid currency associated with the bearer tag,
   wherein the first amount of prepaid currency and the second amount of prepaid currency are independent to the user and the one or more other users respectively,
   wherein the second amount of prepaid currency specified by the bearer tag for the one or more other users is determined by subtracting the first amount from an initial value of the common pool of prepaid currency associated with the bearer tag, and
   wherein the bearer tag has a predetermined limitation on a total number uses of the bearer tag or is valid only for a defined period of time, and the bearer tag also includes one or more of a device type limitation in which the bearer tag is valid only when accessed by a certain user equipment type, and a user account type limitation in which the bearer tag is valid only when accessed by a certain type of user account.

18. An apparatus comprising:
   at least one processor; and
   at least one memory including computer program code,
   the at least one memory and the computer program code configured to, with the at least one processor, cause the apparatus to perform at least the following,
   facilitate access, including granting access rights to allow access, to an interface to allow access to a service via a network, the service determining to detect input from a user for selecting one or more services corresponding to a bearer tag, wherein the bearer tag is reusable by one or more other users while being used by the user, and the user input is indicated by interaction between the bearer tag and a user equipment on or near the bearer tag,
   wherein the bearer tag specifies a first amount of prepaid currency for engaging one or more of the services by the user and specifies a second amount of prepaid currency for the one or more other users,
   wherein the first amount of prepaid currency and the second amount of prepaid currency are from a common pool of prepaid currency associated with the bearer tag,
   wherein the first amount of prepaid currency and the second amount of prepaid currency are independent to the user and the one or more other users respectively,
   wherein the second amount of prepaid currency specified by the bearer tag for the one or more other users is determined by subtracting the first amount from an initial value of the common pool of prepaid currency associated with the bearer tag, and
   wherein the bearer tag has a predetermined limitation on a total number uses of the bearer tag or is valid only for a defined period of time, and the bearer tag also includes one or more of a device type limitation in which the bearer tag is valid only when accessed by a certain user equipment type, and a user account type limitation in which the bearer tag is valid only when accessed by a certain type of user account.

* * * * *